United States Patent
Ge et al.

(10) Patent No.: US 11,057,155 B2
(45) Date of Patent: *Jul. 6, 2021

(54) DATA TRANSMISSION METHOD AND APPARATUS

(71) Applicant: HUAWEI TECHNOLOGIES CO., LTD., Guangdong (CN)

(72) Inventors: Shibin Ge, Shanghai (CN); Xiaoyan Bi, Shanghai (CN); Hongzhe Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,781

(22) Filed: Nov. 1, 2019

(65) Prior Publication Data

US 2020/0067643 A1     Feb. 27, 2020

Related U.S. Application Data

(63) Continuation of application No. 16/428,024, filed on May 31, 2019, now Pat. No. 10,498,491, which is a (Continued)

(30) Foreign Application Priority Data

| | | |
|---|---|---|
| Mar. 24, 2017 | (CN) | 201710183002.2 |
| May 5, 2017 | (CN) | 201710312708.4 |
| Aug. 11, 2017 | (CN) | 201710687507.2 |

(51) Int. Cl.
*H04L 1/00* (2006.01)
*H04L 5/00* (2006.01)
*H04L 27/26* (2006.01)

(52) U.S. Cl.
CPC .......... *H04L 1/0071* (2013.01); *H04L 1/0005* (2013.01); *H04L 5/0051* (2013.01);
(Continued)

(58) Field of Classification Search
CPC ... H04L 1/0005; H04L 1/0017; H04L 1/0071; H04L 5/0051; H04L 27/2605; H04L 27/2608
See application file for complete search history.

(56) References Cited

U.S. PATENT DOCUMENTS

| | | |
|---|---|---|
| 9,942,008 B1 | 4/2018 | Sun et al. |
| 2004/0177306 A1 | 9/2004 | Hiraki |

(Continued)

FOREIGN PATENT DOCUMENTS

| | | |
|---|---|---|
| CN | 101094214 A | 12/2007 |
| CN | 101568128 A | 10/2009 |

(Continued)

OTHER PUBLICATIONS

Extended European Search Report issued in European Application No. 18771858.0 dated Mar. 23, 2020, 11 pages.
(Continued)

*Primary Examiner* — Gary Mui
(74) *Attorney, Agent, or Firm* — Fish & Richardson P.C.

(57) ABSTRACT

Embodiments of this application provide a data transmission method and apparatus. The method includes: transmitting indication information indicating a data distribution manner selected from a first data distribution manner and a second data distribution manner; performing data transmission with a terminal device according to the data distribution manner indicated by the indication information; wherein the data distribution manner indicating a distribution of modulation symbols of a code block (CB) on one or more orthogonal frequency division multiplexing (OFDM) symbols of at least
(Continued)

200

A network device determines, based on a service requirement or an application scenario of a terminal device, a data distribution manner used for performing data transmission with the terminal device, where the data distribution manner is used to indicate distribution of data of a same code block on at least one time-domain symbol    ∽ S210

The network device performs data transmission with the terminal device based on the data distribution manner    ∽ S220 one resource unit, the one or more OFDM symbols are consecutive in time-domain; and wherein modulation symbols distributed on a same OFDM symbol of the one or more OFDM symbols are interleaved in frequency-domain according to the first data distribution manner and are not interleaved in the frequency-domain according to the second data distribution manner.

24 Claims, 19 Drawing Sheets

Related U.S. Application Data continuation of application No. PCT/CN2018/080092, filed on Mar. 22, 2018.

(52) U.S. Cl.
CPC ...... *H04L 27/2605* (2013.01); *H04L 27/2608* (2013.01); *H04L 27/2611* (2013.01); *H04L 5/0007* (2013.01)

(56) References Cited

U.S. PATENT DOCUMENTS

| | | | |
|---|---|---|---|
| 2009/0161733 | A1 | 6/2009 | Maeda et al. |
| 2010/0215007 | A1 | 8/2010 | Zhang et al. |
| 2011/0274071 | A1 | 11/2011 | Lee et al. |
| 2012/0014242 | A1 | 1/2012 | Kim et al. |
| 2013/0201929 | A1 | 8/2013 | Dai et al. |
| 2015/0071048 | A1 | 3/2015 | Kim et al. |
| 2015/0358130 | A1 | 12/2015 | Chen et al. |
| 2016/0028513 | A1 | 1/2016 | Werner et al. |
| 2016/0080000 | A1 | 3/2016 | Starr |
| 2017/0078830 | A1 | 3/2017 | Wu et al. |
| 2018/0176912 | A1 | 6/2018 | Li et al. |
| 2018/0234863 | A1 | 8/2018 | Li et al. |
| 2018/0262308 | A1 | 9/2018 | Si et al. |

FOREIGN PATENT DOCUMENTS

| | | |
|---|---|---|
| CN | 101719888 A | 6/2010 |
| CN | 101826949 | 9/2010 |
| CN | 101965747 A | 2/2011 |
| CN | 102301616 | 12/2011 |
| CN | 103037513 | 4/2013 |
| CN | 103931126 A | 7/2014 |
| CN | 104348580 A | 2/2015 |
| CN | 105164958 A | 12/2015 |
| CN | 105917610 | 8/2016 |
| CN | 106160987 | 11/2016 |
| EP | 3166249 A1 | 5/2017 |
| WO | 2016003229 A1 | 1/2016 |
| WO | 2016070415 | 5/2016 |
| WO | 2018108048 | 6/2018 |

OTHER PUBLICATIONS

Mediatek Inc, "eMBB Encoding Chain," 3GPP TSG-RAN WG1 NR, R1-1702732; Athens, Greece, XP051209879, Feb. 13-17, 2017, 10 pages.
Samsung et al., "Summary of Issues on Codeword-to-Layer Mapping for NR," 3GPP TSG RAN WG1 88bis, R1-1706216; Spokane, USA, XP051252523, Apr. 3-7, 2017 , 4 pages.
EPO Communication pursuant to Article 94(3) EPC issued in European Application No. 18771858.0 dated Sep. 22, 2020, 8 pages.
NTT DOCOMO, "Discussion on Codeword-to-Layer Mapping," 3GPP TSG RAN WG1 Meeting #88, R1-1702851, Athens, Greece Feb. 13-17, 2017, 3 pages.
Office Action issued in Japanese Application No. 2019-547313 dated Oct. 20, 2020, 5 pages (with English translation).
Office Action issued in Chinese Application No. 201810280849.7 dated Dec. 5, 2018, 8 pages.
Office Action issued in Chinese Application No. 201910418665.7 dated Dec. 16, 2019, 3 pages.
PCT International Search Report and Written Opinion issued in International Application No. PCT/CN2018/080092 dated Jun. 21, 2018, 12 pages (partial translation).
R1-1700795—Qualcomm Incorporated, "Codeword to Layer Mapping," 3GPP TSG-RAN WG1 NR Ad-Hoc, Spokane, Washington, USA, Jan. 16-20, 2017, 10 pages.
Search Report issued in Chinese Application No. 201910418665.7 dated Dec. 6, 2019, 2 pages.
MediaTek Inc., "Initial signal design," 3GPP TSG RAN WG1 meeting #82-Bis, R1-156060, Malmo, Sweden, Oct. 5-9, 2015, 3 pages.
Office Action issued in Chinese Application No. 201880020691.8 dated Mar. 1, 2021, 5 pages.

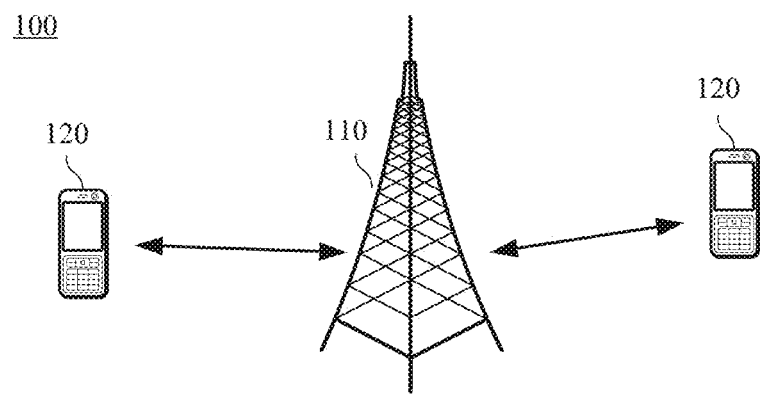

| A network device determines, based on a service requirement or an application scenario of a terminal device, a data distribution manner used for performing data transmission with the terminal device, where the data distribution manner is used to indicate distribution of data of a same code block on at least one time-domain symbol | ~ S210 |

| The network device performs data transmission with the terminal device based on the data distribution manner | ~ S220 |

FIG. 2

DATA TRANSMISSION METHOD AND APPARATUS

CROSS-REFERENCE TO RELATED APPLICATIONS

This application is a continuation of U.S. patent application Ser. No. 16/428,024, filed on May 31, 2019, which is a continuation of International Application No. PCT/CN2018/080092, filed on Mar. 22, 2018. The International Application claims priority to Chinese Patent Application No. 201710183002.2, filed on Mar. 24, 2017 and Chinese Patent Application No. 201710312708.4, filed on May 5, 2017 and Chinese Patent Application No. 201710687507.2, filed on Aug. 11, 2017. All of the afore-mentioned patent applications are hereby incorporated by reference in their entireties.

TECHNICAL FIELD

Embodiments of this application relate to the communications field, and in particular, to a data transmission method and apparatus in the communications field.

BACKGROUND

During data transmission, a transmit end needs to perform channel coding on to-be-sent data from an upper layer, to form a code block (CB), combine different CBs, generate a modulation symbol by modulating a combined CB, perform layer mapping on the modulation symbol, perform precoding on the modulation symbol obtained after layer mapping, and finally map the to-be-sent data to a corresponding time-frequency resource and antenna port for sending.

In the prior art, a data distribution manner is used, for example, a modulation symbol generated through modulation is first mapped to a layer, then mapped to a frequency domain, and finally mapped to a time domain, and interleaving is performed in a mapping process. Data distribution after mapping is that data of a same CB is de-centrally distributed in frequency domain, and is centrally distributed in time domain. There is still room to research and improve such a data distribution manner, so as to improve wireless transmission performance.

SUMMARY

According to a data transmission method and apparatus in embodiments of this application, a data distribution manner used for data transmission between a network device and a terminal device can be flexibly configured, so as to meet different service requirements.

According to a first aspect, a data transmission method is provided, including: determining, by a network device, a data distribution manner used for performing data transmission with the terminal device, where the data distribution manner is used to indicate distribution of data of a same code block on at least one time-domain symbol, and performing, by the network device, data transmission with the terminal device based on the data distribution manner.

Specifically, before performing data transmission with the terminal device, the network device may first determine, based on a service requirement or an application scenario of the terminal device, the data distribution manner used to indicate distribution of data of a same code block on at least one time-domain symbol, and the network device may perform data transmission with the terminal device based on the data distribution manner. For example, when the network device is a transmit end, the network device may process to-be-sent data based on the data distribution manner, and then send processed data to the terminal device. When the network device is a receive end, the network device may determine, based on the data distribution manner, distribution of data sent by the terminal device, so as to accurately obtain the data on a time-frequency resource.

Therefore, the network device may serve as either a transmit end or a receive end. When the network device serves as a transmit end, the terminal device is a receive end, and when the network device serves as a receive end, the terminal device is a transmit end. The method may be applied to uplink transmission between the network device and the terminal device, and may be applied to downlink transmission between the network device and the terminal device. This is not limited in this embodiment of this application.

According to the data transmission method in this embodiment of this application, the network device determines the data distribution manner based on different service requirements or application scenarios, so that the data distribution manner for data transmission between the network device and the terminal device can be flexibly configured, so as to meet different service requirements of a receive end.

In a first possible implementation of the first aspect, the data distribution manner is a time-domain decentralization manner or a time-domain centralization manner, the time-domain decentralization manner is used to indicate that data from a same code block is de-centrally distributed on a plurality of time-domain symbols, and the time-domain centralization manner is used to indicate that data from a same code block is centrally distributed on at least one consecutive time-domain symbol. A time-domain centralized distribution manner 1 uses a manner of preferentially performing frequency-domain mapping and then time-domain mapping, and includes no interleaving. A time-domain centralized distribution manner 2 performs frequency-domain interleaving based on the time-domain centralized distribution manner 1.

Specifically, the data distribution manner may be the time-domain decentralization manner or the time-domain centralization manner. The time-domain decentralization manner indicates that data from a same code block is de-centrally distributed in time domain, and the time-domain centralization manner indicates that data from a same code block is centrally distributed in time domain. A receive end may perform fast demodulation on data distributed in the time-domain centralization manner, so as to meet an application scenario in which data needs to be fast demodulated. For data distributed in the time-domain decentralization manner, transmission reliability is higher, and transmission performance is better. In a time-domain decentralized distribution manner 1, a manner of preferentially performing time-domain mapping and then frequency-domain mapping is used, and then time-domain interleaving is performed. When the manner of preferentially performing frequency-domain mapping and then time-domain mapping is used, and time-frequency interleaving is performed, it indicates a time-domain decentralization manner 2. When the manner of preferentially performing time-domain mapping and then frequency-domain mapping is used, and no interleaving is performed, it indicates a time-domain decentralized distribution manner 3. When the manner of preferentially performing time-domain mapping and then frequency-domain mapping is used, and frequency-domain interleaving is performed, it indicates a time-domain decentralized distribution manner 4. When the manner of preferentially performing time-domain mapping and then frequency-domain mapping is used, and time-domain interleaving is performed, it indicates a time-domain decentralized distribution manner 5. When the manner of preferentially performing time-domain mapping and then frequency-domain mapping is used, and time-frequency interleaving is performed, it indicates a time-domain decentralized distribution manner 6.

It should be understood that, in the time-domain centralization manner, data of a same CB is prioritized to be distributed on one time-domain symbol. When one time-domain symbol is not enough, remaining data of the CB is placed on a neighboring time-domain symbol, and so on. Therefore, when the time-domain centralization manner is used, the data of the same CB is distributed on at least one consecutive time-domain symbol. Although data of a same CB needs to be de-centrally placed in the time-domain decentralization manner, the data from the same CB may not be decentralized to all available time-domain symbols. For example, there are 10 available time-domain symbols in total, and one CB may be de-centrally placed on only three time-domain symbols, five time-domain symbols, or eight time-domain symbols. This should belong to the time-domain decentralization manner in this embodiment of this application.

It should be further understood that the data distribution manner reflects only final distribution of data from a same CB in time domain. This embodiment of this application imposes no limitation on distribution of the data in frequency domain and space domain. For example, when a distribution manner of to-be-sent data in time domain is the time-domain decentralization manner, data from a same CB may be de-centrally or centrally distributed in space and/or frequency domain. A case in the time-domain centralization manner is the same. This is not limited in this embodiment of this application.

In another possible implementation of the first aspect, the time-domain centralization manner is used to indicate that in all code blocks, time-domain symbol indexes of first data and second data whose initial location indexes meet $x_1 < x_2$ meet $n_1 \leq n_2$;

$x_1$ is the initial location index of the first data, $x_2$ is the initial location index of the second data, $n_1$ is the time-domain symbol index of the first data, and $n_2$ is the time-domain symbol index of the second data;

the time-domain decentralization manner is used to indicate that there is a first code block, and in the first code block, time-domain symbol indexes of third data and fourth data whose initial location indexes meet $x_3 < x_4$ meet $n_3 > n_4$; and $x_3$ is the initial location index of the third data, $x_4$ is the initial location index of the fourth data, $n_3$ is the time-domain symbol index of the third data, and $n_4$ is the time-domain symbol index of the fourth data.

In another possible implementation of the first aspect, the time-domain centralization manner is used to indicate that a first time-domain symbol does not include at least two first code blocks, and a maximum value of an initial location index of data that is of the first code block and that is distributed on the first time-domain symbol is not equal to a maximum value of an initial location index of data that is of the first code block and that is distributed on a resource unit, where the resource unit is a basic unit used to perform resource allocation for a scheduled user, and all time-domain symbols in the resource unit are first time-domain symbols; or the time-domain decentralization manner is used to indicate that on a first time-domain symbol including data from Q code blocks, there are at least two second code blocks belonging to the Q code blocks, a maximum value of initial location indexes of data that is of the second code blocks and that is distributed on the first time-domain symbol is not equal to a maximum value of initial location indexes of data that is of the second code blocks and that is distributed on the resource unit, and Q is an integer greater than 1.

In another possible implementation of the first aspect, the time-domain decentralization manner includes:

a first time-domain decentralization manner, used to indicate that data from a same code block is de-centrally distributed on all time-domain symbols in a resource unit, where the resource unit is a basic unit used to perform resource allocation for a scheduled user:

a second time-domain decentralization manner, used to indicate that data from a same code block is de-centrally distributed on all time-domain symbols of a same slot in the resource unit; and a third time-domain decentralization manner, used to indicate that data from a same code block is de-centrally distributed on N time-domain symbols in the resource unit, where N is an integer greater than 1.

With reference to the foregoing possible implementations of the first aspect, in a second possible implementation of the first aspect, the method further includes: determining, by the network device, a demodulation reference signal DMRS attribute based on a service requirement or an application scenario of the terminal device, where the DMRS attribute is corresponding to the data distribution manner, and the DMRS attribute is a DMRS pattern or a DMRS port number; and sending, by the network device, the DMRS attribute to the terminal device.

Specifically, the network device and the terminal device need to determine the demodulation reference signal (DMRS) pattern or the DMRS port number when performing data transmission. Therefore, in this embodiment of this application, the DMRS pattern or the DMRS port number is collectively referred to as the DMRS attribute, and the DMRS attribute is bound to the data distribution manner configured by the network device, that is, different DMRS attributes are corresponding to different data distribution manners. In this way, the network device notifies the terminal device of the DMRS attribute that is used during data transmission with the terminal device. The terminal device may determine, based on the DMRS attribute, the data distribution manner used for performing data transmission with the network device, so as to send data to the network device based on the data distribution manner or receive, based on the data distribution manner, data sent by the network device.

It should be understood that in addition to the DMRS pattern or the DMRS port number, the DMRS attribute may be a scrambling code or an orthogonal sequence of the DMRS or a quantity of OFDM symbols occupied by the DMRS signal to which the DMRS attribute belongs. This is not limited in this embodiment of this application.

In another possible implementation of the first aspect, when the application scenario is that a demodulation result needs to be fed back on a current resource unit, the DMRS attribute is corresponding to the time-domain centralization manner, where the resource unit is a basic unit used to perform resource allocation for a scheduled user; or when the application scenario is that a demodulation result does not need to be fed back on a current resource unit, the DMRS attribute is corresponding to the time-domain decentralization manner.

In another possible implementation of the first aspect, when the DMRS pattern is that the DMRS occupies one time-domain symbol, the DMRS pattern is corresponding to the time-domain centralization manner; or when the DMRS pattern is that the DMRS occupies at least two time-domain symbols, when there is no data transmission between any two time-domain symbols occupied by the DMRS, the DMRS pattern is corresponding to the time-domain centralization manner, or when there is data transmission between the at least two time-domain symbols occupied by the DMRS, the DMRS attribute is corresponding to the time-domain decentralization manner.

In another possible implementation of the first aspect, the method further includes:

determining, by the network device based on a service requirement or an application scenario of the terminal device, a frame structure used for performing data transmission, where the frame structure is corresponding to the data distribution manner.

In another possible implementation of the first aspect, when the application scenario of the terminal device is that a demodulation result needs to be fed back on a current resource unit, the frame structure is corresponding to the time-domain centralization manner, where the resource unit is a basic unit used to perform resource allocation for a scheduled user; or when the application scenario of the terminal device is that a demodulation result does not need to be fed back on a current resource unit, the frame structure is corresponding to the time-domain decentralization manner.

With reference to the foregoing possible implementations of the first aspect, in a third possible implementation of the first aspect, the method further includes: sending, by the network device, indication information to the terminal device, where the indication information is used to indicate the data distribution manner.

Specifically, the network device may directly notify, by using the indication information, the terminal device of the data distribution manner used for performing data transmission with the terminal device. The terminal device may directly determine, according to the indication information, the data distribution manner used for performing data transmission with the network device, so as to send data to the network device based on the data distribution manner, or receive, based on the data distribution manner, data sent by the network device.

With reference to the foregoing possible implementations of the first aspect, in a fourth possible implementation of the first aspect, the indication information is any one of the following information; downlink control information DCI, radio resource control RRC signaling, and a Media Access Control MAC layer control element CE.

With reference to the foregoing possible implementations of the first aspect, in a fifth possible implementation of the first aspect, the performing, by the network device, data transmission with the terminal device based on the data distribution manner includes: processing, by the network device, to-be-sent data based on the data distribution manner, and sending, by the network device, processed to-be-sent data to the terminal device.

Specifically, when the network device serves as a transmit end, the network device may process the to-be-sent data based on the data distribution manner, and then send the processed to-be-sent data to the terminal device, so that the data meets a determined distribution situation.

With reference to the foregoing possible implementations of the first aspect, in a sixth possible implementation of the first aspect, the processing, by the network device, to-be-sent data based on the data distribution manner includes: performing, by the network device, interleaving processing on the to-be-sent data based on the data distribution manner, where the interleaving processing includes interleaving on a bit stream of the to-be-sent data and/or interleaving on a modulation symbol of the to-be-sent data.

Specifically, before the to-be-sent data is sent, the to-be-sent data is processed through a series of steps such as channel coding, code block concatenation, modulation mapping, layer mapping, precoding, and resource mapping. In this embodiment of this application, the network device may process the to-be-sent data, and may perform bit-level interleaving or symbol-level interleaving on the to-be-sent data. This is not limited in this embodiment of this application.

With reference to the foregoing possible implementations of the first aspect, in a seventh possible implementation of the first aspect, the processing, by the network device, to-be-sent data based on the data distribution manner includes: performing, by the network device, resource mapping on the to-be-sent data by using a resource mapping rule corresponding to the data distribution manner based on the data distribution manner.

Specifically, when performing resource mapping on the to-be-sent data, the network device may select the resource mapping rule corresponding to the data distribution manner based on the data distribution manner, so as to perform resource mapping on the to-be-sent data. For example, when the data distribution manner is the time-domain centralization manner, the network device may select a resource mapping manner that can produce an effect that data of a same code block is centrally distributed in time domain. When the data distribution manner is the time-domain decentralization manner, the network device may select a resource mapping manner that can produce an effect that data of a same code block is de-centrally distributed in time domain.

With reference to the foregoing possible implementations of the first aspect, in an eighth possible implementation of the first aspect, the performing, by the network device, data transmission with the terminal device based on the data distribution manner includes: receiving, by the network device based on the data distribution manner, data sent by the terminal device.

Correspondingly, the terminal device may determine, based on a same factor or the received indication information, the data distribution manner used for performing data transmission with the network device, for example, determine the data distribution manner based on the DMRS attribute or the frame structure. In addition, the terminal device may determine the data distribution manner in combination with the received indication information.

According to a second aspect, another data transmission method is provided, including: receiving, by a terminal device, indication information sent by a network device, where the indication information is used to indicate a data distribution manner used for performing data transmission by the terminal device with the network device, and the data distribution manner is used to indicate distribution of data of a same code block on at least one time-domain symbol; determining, by the terminal device, the data distribution manner according to the indication information; and performing, by the terminal device, data transmission with the network device based on the data distribution manner.

In a first possible implementation of the second aspect, the data distribution manner is a time-domain decentralization manner or a time-domain centralization manner, the time-domain decentralization manner is used to indicate that data from a same code block is de-centrally distributed on a plurality of time-domain symbols, and the time-domain centralization manner is used to indicate that data from a same code block is centrally distributed on at least one consecutive time-domain symbol.

With reference to the foregoing possible implementation of the second aspect, in a second possible implementation of the second aspect, the indication information is any one of the following information; downlink control information DCI, radio resource control RRC signaling, and a Media Access Control MAC layer control element CE.

With reference to the foregoing possible implementations of the second aspect, in a third possible implementation of the second aspect, the performing, by the terminal device, data transmission with the network device based on the data distribution manner includes: processing, by the terminal device, to-be-sent data based on the data distribution manner, and sending, by the terminal device, processed to-be-sent data to the network device.

With reference to the foregoing possible implementations of the second aspect, in a fourth possible implementation of the second aspect, the processing, by the terminal device, to-be-sent data based on the data distribution manner includes: performing, by the terminal device, interleaving processing on the to-be-sent data based on the data distribution manner, where the interleaving processing includes interleaving on a bit stream of the to-be-sent data and/or interleaving on a modulation symbol of the to-be-sent data.

With reference to the foregoing possible implementations of the second aspect, in a fifth possible implementation of the second aspect, the processing, by the terminal device, to-be-sent data based on the data distribution manner includes: performing, by the terminal device, resource mapping on the to-be-sent data by using a resource mapping rule corresponding to the data distribution manner based on the data distribution manner.

With reference to the foregoing possible implementations of the second aspect, in a sixth possible implementation of the second aspect, the performing, by the terminal device, data transmission with the network device based on the data distribution manner includes: receiving, by the terminal device based on the data distribution manner, data sent by the network device.

In another possible implementation of the second aspect, the time-domain centralization manner is used to indicate that in all code blocks, time-domain symbol indexes of first data and second data whose initial location indexes meet $x_1 < x_2$ meet $n_1 \leq n_2$;

$x_1$ is the initial location index of the first data, $x_2$ is the initial location index of the second data, $n_1$ is the time-domain symbol index of the first data, and $n_2$ is the time-domain symbol index of the second data;

the time-domain decentralization manner is used to indicate that there is a first code block, and in the first code block, time-domain symbol indexes of third data and fourth data whose initial location indexes meet $x_3 < x_4$ meet $n_3 > n_4$; and $x_3$ is the initial location index of the third data, $x_4$ is the initial location index of the fourth data, $n_3$ is the time-domain symbol index of the third data, and $n_4$ is the time-domain symbol index of the fourth data.

In another possible implementation of the second aspect, the time-domain centralization manner is used to indicate that a first time-domain symbol does not include at least two first code blocks, and a maximum value of an initial location index of data that is of the first code block and that is distributed on the first time-domain symbol is not equal to a maximum value of an initial location index of data that is of the first code block and that is distributed on a resource unit, where the resource unit is a basic unit used to perform resource allocation for a scheduled user, and all time-domain symbols in the resource unit are first time-domain symbols; or the time-domain decentralization manner is used to indicate that on a first time-domain symbol including data from Q code blocks, there are at least two second code blocks belonging to the Q code blocks, a maximum value of initial location indexes of data that is of the second code blocks and that is distributed on the first time-domain symbol is not equal to a maximum value of initial location indexes of data that is of the second code blocks and that is distributed on the resource unit, and Q is an integer greater than 1.

In another possible implementation of the second aspect, the time-domain decentralization manner includes:

a first time-domain decentralization manner, used to indicate that data from a same code block is de-centrally distributed on all time-domain symbols in a resource unit, where the resource unit is a basic unit used to perform resource allocation for a scheduled user;

a second time-domain decentralization manner, used to indicate that data from a same code block is de-centrally distributed on all time-domain symbols of a same slot in the resource unit; and a third time-domain decentralization manner, used to indicate that data from a same code block is de-centrally distributed on N time-domain symbols in the resource unit, where N is an integer greater than 1.

According to a third aspect, another data transmission method is provided, including: receiving, by a terminal device, a demodulation reference signal DMRS attribute sent by a network device, where the DMRS attribute is corresponding to a data distribution manner, and the DMRS attribute is a DMRS pattern, a DMRS port number, or a quantity of OFDM symbols occupied by the DMRS signal to which the DMRS attribute belongs; determining, by the terminal device based on the DMRS attribute, a data distribution manner used for performing data transmission with the network device, where the data distribution manner is used to indicate distribution of data of a same code block on at least one time-domain symbol and performing, by the terminal device, data transmission with the network device based on the data distribution manner.

In a first possible implementation of the third aspect, the data distribution manner is a time-domain decentralization manner or a time-domain centralization manner, the time-domain decentralization manner is used to indicate that data from a same code block is de-centrally distributed on a plurality of time-domain symbols, and the time-domain centralization manner is used to indicate that data from a same code block is centrally distributed on at least one consecutive time-domain symbol.

With reference to the foregoing possible implementation of the third aspect, in a second possible implementation of the third aspect, the performing, by the terminal device, data transmission with the network device based on the data distribution manner includes: processing, by the terminal device, to-be-sent data based on the data distribution manner, and sending, by the terminal device, processed to-be-sent data to the network device.

With reference to the foregoing possible implementations of the third aspect, in a third possible implementation of the third aspect, the processing, by the terminal device, to-besent data based on the data distribution manner includes: performing, by the terminal device, interleaving processing on the to-be-sent data based on the data distribution manner, where the interleaving processing includes interleaving on a bit stream of the to-be-sent data and/or interleaving on a modulation symbol of the to-be-sent data.

With reference to the foregoing possible implementations of the third aspect, in a fourth possible implementation of the third aspect, the processing, by the terminal device, to-be-sent data based on the data distribution manner includes: performing, by the terminal device, resource mapping on the to-be-sent data by using a resource mapping rule corresponding to the data distribution manner based on the data distribution manner.

With reference to the foregoing possible implementations of the third aspect, in a fifth possible implementation of the third aspect, the performing, by the terminal device, data transmission with the network device based on data distribution manner includes: receiving, by the terminal device based on the data distribution manner, data sent by the network device.

In another possible implementation of the third aspect, the time-domain centralization manner is used to indicate that in all code blocks, time-domain symbol indexes of first data and second data whose initial location indexes meet $x_1<x_2$ meet $n_1 \le n_2$.

$x_1$ is the initial location index of the first data, $x_2$ is the initial location index of the second data, $n_1$ is the time-domain symbol index of the first data, and $n_2$ is the time-domain symbol index of the second data;

the time-domain decentralization manner is used to indicate that there is a first code block, and in the first code block, time-domain symbol indexes of third data and fourth data whose initial location indexes meet $x_3<x_4$ meet $n_3>n_4$; and $x_3$ is the initial location index of the third data, $x_4$ is the initial location index of the fourth data, $n_3$ is the time-domain symbol index of the third data, and $n_4$ is the time-domain symbol index of the fourth data.

In another possible implementation of the third aspect, the time-domain centralization manner is used to indicate that a first time-domain symbol does not include at least two first code blocks, and a maximum value of an initial location index of data that is of the first code block and that is distributed on the first time-domain symbol is not equal to a maximum value of an initial location index of data that is of the first code block and that is distributed on a resource unit, where the resource unit is a basic unit used to perform resource allocation for a scheduled user, and all time-domain symbols in the resource unit are first time-domain symbols; or the time-domain decentralization manner is used to indicate that on a first time-domain symbol including data from Q code blocks, there are at least two second code blocks belonging to the Q code blocks, a maximum value of initial location indexes of data that is of the second code blocks and that is distributed on the first time-domain symbol is not equal to a maximum value of initial location indexes of data that is of the second code blocks and that is distributed on the resource unit, and Q is an integer greater than 1.

In another possible implementation of the third aspect, the time-domain decentralization manner includes:

a first time-domain decentralization manner, used to indicate that data from a same code block is de-centrally distributed on all time-domain symbols in a resource unit, where the resource unit is a basic unit used to perform resource allocation for a scheduled user;

a second time-domain decentralization manner, used to indicate that data from a same code block is de-centrally distributed on all time-domain symbols of a same slot in the resource unit; and a third time-domain decentralization manner, used to indicate that data from a same code block is de-centrally distributed on N time-domain symbols in the resource unit, where N is an integer greater than 1.

In another possible implementation of the third aspect, when an application scenario is that a demodulation result needs to be fed back on a current resource unit, the DMRS attribute is corresponding to the time-domain centralization manner, where the resource unit is a basic unit used to perform resource allocation for a scheduled user; or when an application scenario is that a demodulation result does not need to be fed back on a current resource unit, the DMRS attribute is corresponding to the time-domain decentralization manner.

In another possible implementation of the third aspect, when the DMRS pattern is that the DMRS occupies one time-domain symbol, the DMRS pattern is corresponding to the time-domain centralization manner; or when the DMRS pattern is that the DMRS occupies at least two time-domain symbols, when there is no data transmission between any two time-domain symbols occupied by the DMRS, the DMRS pattern is corresponding to the time-domain centralization manner, or when there is data transmission between the at least two time-domain symbols occupied by the DMRS, the DMRS attribute is corresponding to the time-domain decentralization manner.

According to a fourth aspect, another data transmission method is provided, including: determining, by a terminal device based on a frame structure used for performing data transmission with a network device, a data distribution manner used for performing data transmission with the network device, where the data distribution manner is used to indicate distribution of data of a same code block on at least one time-domain symbol; and performing, by the terminal device, data transmission with the network device based on the data distribution manner.

In a first possible implementation of the fourth aspect, the data distribution manner is a time-domain decentralization manner or a time-domain centralization manner, the time-domain decentralization manner is used to indicate that data from a same code block is de-centrally distributed on a plurality of time-domain symbols, and the time-domain centralization manner is used to indicate that data from a same code block is centrally distributed on at least one consecutive time-domain symbol.

With reference to the foregoing possible implementation of the fourth aspect, in a second possible implementation of the fourth aspect, the time-domain centralization manner is used to indicate that in all code blocks, time-domain symbol indexes of first data and second data whose initial location indexes meet $x_1<x_2$ meet $n_1 \le n_2$;

$x_1$ is the initial location index of the first data, $x_2$ is the initial location index of the second data, $n_1$ is the time-domain symbol index of the first data, and $n_2$ is the time-domain symbol index of the second data;

the time-domain decentralization manner is used to indicate that there is a first code block, and in the first code block, time-domain symbol indexes of third data and fourth data whose initial location indexes meet $x_z<x_4$ meet $n_3>n_4$; and $x_3$ is the initial location index of the third data, $x_4$ is the initial location index of the fourth data, $n_1$ is the time-domain symbol index of the third data, and $n_4$ is the time-domain symbol index of the fourth data.

With reference to the foregoing possible implementations of the fourth aspect, in a third possible implementation of the fourth aspect, the time-domain centralization manner is used to indicate that a first time-domain symbol does not include at least two first code blocks, and a maximum value of an initial location index of data that is of the first code block and that is distributed on the first time-domain symbol is not equal to a maximum value of an initial location index of data that is of the first code block and that is distributed on a resource unit, where the resource unit is a basic unit used to perform resource allocation for a scheduled user, and all time-domain symbols in the resource unit are first time-domain symbols; or the time-domain decentralization manner is used to indicate that on a first time-domain symbol including data from Q code blocks, there are at least two second code blocks belonging to the Q code blocks, a maximum value of initial location indexes of data that is of the second code blocks and that is distributed on the first time-domain symbol is not equal to a maximum value of initial location indexes of data that is of the second code blocks and that is distributed on the resource unit, and Q is an integer greater than 1.

With reference to the foregoing possible implementations of the fourth aspect, in a fourth possible implementation of the fourth aspect, the time-domain decentralization manner includes:

a first time-domain decentralization manner, used to indicate that data from a same code block is de-centrally distributed on all time-domain symbols in a resource unit, where the resource unit is a basic unit used to perform resource allocation for a scheduled user;

a second time-domain decentralization manner, used to indicate that data from a same code block is de-centrally distributed on all time-domain symbols of a same slot in the resource unit; and a fourth time-domain decentralization manner, used to indicate that data from a same code block is de-centrally distributed on N time-domain symbols in the resource unit, where N is an integer greater than 1.

With reference to the foregoing possible implementations of the fourth aspect, in a fifth possible implementation of the fourth aspect, when an application scenario of the terminal device is that a demodulation result needs to be fed back on a current resource unit, the frame structure is corresponding to the time-domain centralization manner, where the resource unit is a basic unit used to perform resource allocation for a scheduled user; or when an application scenario of the terminal device is that a demodulation result does not need to be fed back on a current resource unit, the frame structure is corresponding to the time-domain decentralization manner.

A fifth aspect of the embodiments of the present application provides a data transmission method. A terminal device determines a data distribution manner used for performing data transmission with a network device, where the data distribution manner is used to indicate distribution of data of a same code block on at least one time-domain symbol; and the terminal device performs data transmission with the network device based on the data distribution manner.

With reference to the methods provided in the first aspect to the fifth aspect, possible implementations further include:

(1) When a demodulation result, namely, an ACK/NACK, needs to be fed back on a current scheduling resource or slot, the DMRS pattern is that the DMRS occupies at least two time-domain symbols, and there is no data transmission between any two time-domain symbols occupied by the DMRS, a time-domain centralized distribution manner 1 or 2 is used. The time-domain centralized distribution manner 1 does not include interleaving, is easy to implement, and is applicable to a small bandwidth. In the time-domain centralized distribution manner 2, a frequency domain diversity gain may be obtained through frequency-domain interleaving.

(2) When a demodulation result, namely, an ACK/NACK, needs to be fed back on a current scheduling resource, the DMRS pattern is that the DMRS occupies at least two time-domain symbols, and there is data transmission between any two time-domain symbols occupied by the DMRS, one of time-domain decentralized distribution manners 1-6 is used. When the DMRS pattern is that the DMRS occupies at least two time-domain symbols, and there is data transmission between any two time-domain symbols occupied by the DMRS, it indicates that the terminal device moves at a high speed, and a time diversity gain may be obtained in the time-domain decentralized distribution manner. In a possible implementation, under this condition, a time-domain centralized distribution manner 1 may also be used, considering that the ACK/NACK needs to be fed back on the current scheduling resource, and there is a fast demodulation requirement. In this case, there is data transmission between two time-domain symbols occupied by the DMRS, and channel estimation consumes time, which is not conducive to fast demodulation. Therefore, to save time, no interleaving is performed.

(3) When a demodulation result does not need to be fed back on a current scheduling resource, the DMRS pattern is that the DMRS occupies at least two time-domain symbols, and there is data transmission between any two time-domain symbols occupied by the DMRS, one of time-domain decentralized distribution manners 1-6 is used. When the DMRS pattern is that the DMRS occupies at least two time-domain symbols, and there is data transmission between any two time-domain symbols occupied by the DMRS, it indicates that the terminal device moves at a high speed, and a time diversity gain may be obtained through time-domain decentralization.

(4) When a demodulation result does not need to be fed back on a current scheduling resource, the DMRS pattern is that the DMRS occupies at least two time-domain symbols, and there is no data transmission between any two time-domain symbols occupied by the DMRS, one of time-domain centralized distribution manners 1-2 is used. In this case, considering that DMRS signals are centralized, the terminal device does not move fast, and a time diversity gain effect is not strong, the time-domain centralized distribution manners 1-2 are used. In a possible implementation, one of time-domain decentralized distribution manners 1-6 may also be used. One of the time-domain decentralization manners 1-6 is used considering that although the time diversity gain is not obvious in this case, the time-domain decentralization manner may be consistent with a data distribution manner in another scenario because the demodulation result does not need to be fed back on the current scheduling resource, so as to facilitate implementation. The another scenario described herein refers to a case in which there is no data transmission between any two time-domain symbols occupied by the DMRS when the DMRS occupies at least two time-domain symbols.

(5) In addition to the DMRS attribute and the frame structure, the data distribution manner may be determined based on a channel state information reference signal (CSI-RS). Generally, when the terminal device is in a high-speed moving scenario, CSI-RS density is relatively high. Therefore, in a high CSI-RS density scenario, one of the time-domain decentralized distribution manners 1-6 may be used. Therefore, in the high-speed moving scenario, a better time diversity gain may be obtained by using a time-domain decentralization manner. On the contrary, in a low CSI-RS density scenario, one of time-domain centralized distribution manners 1-2 is used. Low density indicates that the terminal device is in a low-speed moving scenario. In this scenario, a time diversity gain is not obvious, and using a time-domain centralized distribution manner facilitates fast demodulation.

(6) The network device may also determine the data distribution manner through slot aggregation configuration. When a demodulation result does not need to be fed back on a current scheduling resource, and slot aggregation is not performed, the network device uses a time-domain centralized distribution manner 1 or 2. On the contrary, when the demodulation result does not need to be fed back on the current scheduling resource, and the slot aggregation manner is used, the network device uses a time-domain decentralized distribution manner.

(7) When a hybrid automatic repeat request (Hybrid Automatic Repeat reQuest, HARQ) technology is used for performing CBG-based retransmission, a time-domain centralized distribution manner 1 or 2 is used. For CBG-based HARQ retransmission, when a time-domain decentralized data distribution manner is used, once an error occurs, usually a plurality of CBGs encounter an error. Consequently, CBG-based HARQ retransmission becomes meaningless. If code word (CW)-based HARQ retransmission is performed, one of time-domain decentralized distribution manners 1-6 is used.

(8) A 5G new radio (NR) technology supports two types of carrier waveforms: direct Fourier transform spread orthogonal frequency division multiplexing (DFT-s-OFDM) and cyclic prefix orthogonal frequency division multiplexing (CP-OFDM). When the DFT-s-OFDM is used, one of time-domain decentralized distribution manners 1-6 is used. When the CP-OFDM is used, one of time-domain centralized distribution manners 1-2 is used.

(9) One CW in NR may be mapped to four layers. The network device may determine a to-be-used data distribution manner based on a quantity of layers that is corresponding to one CW. When a quantity of layers that is corresponding to one CW is 1, a data distribution manner without interleaving is used, such as a time-domain centralized distribution manner 1 or a time-domain decentralized distribution manner 3. When the quantity of layers that is corresponding to the CW is 2, 3, or 4, a time-domain centralized distribution manner 2 with frequency-domain interleaving or a time-domain decentralized distribution manner 4 with frequency-domain interleaving is used. In a possible implementation, alternatively, when the quantity of layers that is corresponding to the CW is 1 or 2, a data distribution manner without interleaving is used, such as the time-domain centralized distribution manner 1 or the time-domain decentralized distribution manner 3. When the quantity of layers that is corresponding to the CW is 3 or 4, the time-domain centralized distribution manner 2 with frequency-domain interleaving or the time-domain decentralized distribution manner 4 with frequency-domain interleaving is used. A prerequisite for obtaining a gain by using frequency-domain interleaving and time-frequency interleaving is that there are a plurality of CBs and a relatively small quantity of layers. It is less possible that there are a plurality of CBs on one OFDM symbol or several OFDM symbols, and it is more possible that there are a plurality of CBs at a plurality of layers. Therefore, no interleaving is performed when there is a relatively small quantity of layers, which is easy to implement. When there is a large quantity of layers, a gain is obtained through interleaving.

(10) During data transmission, initial data transmission and data retransmission may use a same data distribution manner. In a possible embodiment, initial transmission and retransmission may also use different data distribution manners. For example, initially transmitted data uses a data distribution manner without interleaving, for example, a time-domain centralized distribution manner 1 or a time-domain decentralized distribution manner 3. Retransmitted data uses a data distribution manner with frequency-domain interleaving, for example, a time-domain centralized distribution manner 2 or a time-domain decentralized distribution manner 4. In a possible embodiment, retransmitted data may also use a time-domain interleaving manner, such as time-domain decentralized distribution manners 1, 2, 5, and 6. If retransmission and initial transmission use a same manner, they are easy to implement. Interleaving is used for retransmission. This is because when retransmission has been performed, it indicates that a channel is under a poor condition, and interleaving is required to improve retransmission performance.

(11) When the DMRS occupies three or more time-domain symbols, and there is data transmission between the three or more time-domain symbols, one of time-domain decentralized distribution manners 1-6 is used. Referring to FIG. 30, a DMRS occupies at least a first time-domain symbol, a second time-domain symbol, and a third time-domain symbol. Data is transmitted between the first time-domain symbol and the second time-domain symbol, and data is also transmitted between the second time-domain symbol and the third time-domain symbol. In addition, the first time-domain symbol, the second time-domain symbol, and the third time-domain symbol are arranged sequentially in time domain. In this case, one of the time-domain decentralized distribution manners 1-6 is used. The DMRS occupies three or more time-domain symbols, and there is data transmission between each other. It is difficult to implement fast demodulation in this case. Therefore, a time-domain decentralized data distribution manner is used to obtain a performance gain.

(12) When the DMRS pattern is that the DMRS occupies at least two time-domain symbols, there is data transmission between any two time-domain symbols occupied by the DMRS, and code word (CW)-based HARQ retransmission is performed, one of time-domain decentralized distribution manners 1-6 is used.

(13) When a DMRS demodulation result is not fed back on a current scheduling resource, and code word (CW)-based HARQ retransmission is performed, one of time-domain decentralized distribution manners 1-6 is used.

(14) When a DMRS demodulation result is not fed back on a current scheduling resource, code word-based HARQ retransmission is performed, the DMRS pattern is that the DMRS occupies at least two time-domain symbols, and there is data transmission between any two time-domain symbols occupied by the DMRS, one of time-domain decentralized distribution manners 1-6 is used.

(15) When the DMRS pattern is that the DMRS occupies at least two time-domain symbols, there is data transmission between any two time-domain symbols occupied by the DMRS, and CBG-based HARQ retransmission is performed, a time-domain decentralized distribution manner is used, and a range of time-domain decentralization is within one CBG

(16) When a demodulation result is not fed back on a current scheduling resource, and CBG-based HARQ retransmission is performed, a time-domain decentralized distribution manner is used, and a range of time-domain decentralization is within one CBG

(17) When a demodulation result is not fed back on a current scheduling resource, the DMRS pattern is that the DMRS occupies at least two time-domain symbols, there is data transmission between any two time-domain symbols occupied by the DMRS, and CBG-based HARQ retransmission is performed, a time-domain decentralized distribution manner is used, and a range of time-domain decentralization is within one CBG According to a sixth aspect, a data transmission apparatus is provided, configured to perform the method according to the first aspect or any possible implementation of the first aspect. Specifically, the apparatus includes a unit configured to perform the method according to the first aspect or any possible implementation of the first aspect.

According to a seventh aspect, a data transmission apparatus is provided, configured to perform the method according to the second aspect or any possible implementation of the second aspect. Specifically, the apparatus includes a unit configured to perform the method according to the second aspect or any possible implementation of the second aspect.

According to an eighth aspect, a data transmission apparatus is provided, configured to perform the method according to the third aspect or any possible implementation of the third aspect. Specifically, the apparatus includes a unit configured to perform the method according to the third aspect or any possible implementation of the third aspect.

According to a ninth aspect, a data transmission apparatus is provided, configured to perform the method according to the fourth aspect or any possible implementation of the third aspect. Specifically, the apparatus includes a unit configured to perform the method according to the fourth aspect or any possible implementation of the fourth aspect.

According to a tenth aspect, a data transmission apparatus is provided, where the apparatus includes a transceiver, a memory, and a processor. The transceiver, the memory, and the processor communicate with each other by using an internal connection channel. The memory is configured to store an instruction. The processor is configured to execute the instruction stored in the memory, to control the transceiver to receive a signal and control the transceiver to send a signal. In addition, when the processor executes the instruction stored in the memory, the execution enables the processor to perform the method according to the first aspect or any possible implementation of the first aspect.

According to an eleventh aspect, a data transmission apparatus is provided, where the apparatus includes a transceiver, a memory, and a processor. The transceiver, the memory, and the processor communicate with each other by using an internal connection channel. The memory is configured to store an instruction. The processor is configured to execute the instruction stored in the memory, to control the receiver to receive a signal and control the transmitter to send a signal. In addition, when the processor executes the instruction stored in the memory, the execution enables the processor to perform the method according to the second aspect or any possible implementation of the second aspect.

According to a twelfth aspect, a data transmission apparatus is provided, where the apparatus includes a transceiver, a memory, and a processor. The transceiver, the memory, and the processor communicate with each other by using an internal connection channel. The memory is configured to store an instruction. The processor is configured to execute the instruction stored in the memory, to control the receiver to receive a signal and control the transmitter to send a signal. In addition, when the processor executes the instruction stored in the memory, the execution enables the processor to perform the method according to the third aspect or any possible implementation of the third aspect.

According to a thirteenth aspect, a data transmission apparatus is provided, where the apparatus includes a transceiver, a memory, and a processor. The transceiver, the memory, and the processor communicate with each other by using an internal connection channel. The memory is configured to store an instruction. The processor is configured to execute the instruction stored in the memory, to control the receiver to receive a signal and control the transmitter to send a signal. In addition, when the processor executes the instruction stored in the memory, the execution enables the processor to perform the method according to the fourth aspect or any possible implementation of the fourth aspect.

According to a fourteenth aspect, a computer readable medium is provided, and is configured to store a computer program. The computer program includes an instruction used to perform the method according to the first aspect or any possible implementation of the first aspect.

According to a fifteenth aspect, a computer readable medium is provided, and is configured to store a computer program. The computer program includes an instruction used to perform the method according to the second aspect or any possible implementation of the second aspect.

According to a sixteenth aspect, a computer readable medium is provided, and is configured to store a computer program. The computer program includes an instruction used to perform the method according to the third aspect or any possible implementation of the third aspect.

According to a seventeenth aspect, a computer readable medium is provided, and is configured to store a computer program. The computer program includes an instruction used to perform the method according to the fourth aspect or any possible implementation of the fourth aspect.

According to an eighteenth aspect, a circuit is provided, where the circuit is configured to perform one implementation of the first aspect to the fifth aspect, or perform any possible implementation of the first aspect to the fourth aspect.

BRIEF DESCRIPTION OF DRAWINGS

FIG. 1 is a schematic diagram of a communications system according to an embodiment of this application;

FIG. 2 is a schematic flowchart of a data transmission method according to an embodiment of this application;

DESCRIPTION OF EMBODIMENTS

Figure 3:
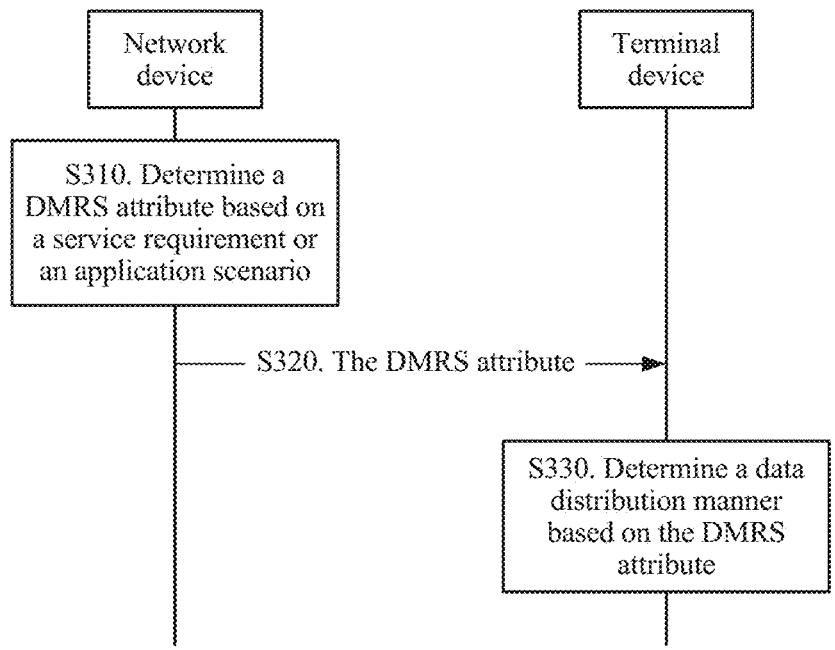
FIG. 3 is a schematic flowchart of another data transmission method according to an embodiment of this application.

The following describes the technical solutions in the embodiments of this application with reference to the accompanying drawings in the embodiments of this application.

The technical solutions in the embodiments of this application may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and a future 5G system.

FIG. 1 shows a communications system 100 to which an embodiment of this application is applied. The communications system 100 may include at least one network device 110. The network device 110 may be a device that communicates with a terminal device, for example, may be a base station or a base station controller. Each network device 110 may provide communication coverage for a specific geographic area, and may communicate with a terminal device (for example, UE) in the coverage area (a cell). The network device 110 may be a base transceiver station (BTS) in a GSM system or a Code Division Multiple Access (CDMA) system, or a NodeB (NB) in a WCDMA system, or an evolved NodeB (eNB, or eNodeB) in an LTE system, or a radio controller in a cloud radio access network (CRAN), or the network device may be a relay node, an access point, an in-vehicle device, a wearable device, a network-side device in a future 5G network, or a network device in a future evolved public land mobile network (PLMN), or the like.

The wireless communications system 100 further includes a plurality of terminal devices 120 within a coverage area of the network device 110. The terminal device 120 may be mobile or fixed. The terminal device 120 may refer to an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like.

FIG. 1 shows one network device 110 and two terminal devices 120 as an example. Optionally, the communications system 100 may include a plurality of network devices 110, and a coverage area of each network device 110 may include another quantity of terminal devices 120. This is not limited in this embodiment of this application.

Optionally, the wireless communications system 100 may further include another network entity such as a network controller and a mobility management entity. This is not limited in this embodiment of this application.

FIG. 2 is a schematic flowchart of a data transmission method 200 according to an embodiment of this application. The method 200 may be applied to the communications system 100 shown in FIG. 1. However, this is not limited in this embodiment of this application.

S210. A network device 110 determines, based on a service requirement or an application scenario of a terminal device 120, a data distribution manner used for performing data transmission with the terminal device 120. The data distribution manner is used to indicate distribution of data of a same code block on at least one time-domain symbol.

S220. The network device 110 performs data transmission with the terminal device 120 based on the data distribution manner.

Specifically, before performing data transmission with the terminal device 120, the network device 110 may first determine, based on the service requirement or the application scenario of the terminal device 120, the data distribution manner used to indicate distribution of data of a same code block on at least one time-domain symbol. The network device 110 may perform data transmission with the terminal device 120 based on the data distribution manner. For example, if the network device 110 is a transmit end, the network device 110 may process to-be-sent data based on the data distribution manner, and then send processed data to the terminal device 120. If the network device 110 is a receive end, the network device 110 may determine, based on the data distribution manner, distribution of data sent by the terminal device 120, so as to accurately obtain the data on a time-frequency resource.

It should be understood that the service requirement may be fast data demodulation, high data transmission performance, or another requirement. This is not limited in this embodiment of this application. The application scenario may be that the network device 110 determines, based on a channel change status of the terminal device 120, that the terminal device 120 is currently in a high-speed scenario or a low-speed scenario. This is not limited in this embodiment of this application either.

Therefore, the network device 110 may serve as either a transmit end or a receive end. When the network device 110 serves as a transmit end, the terminal device 120 serves as a receive end, and when the network device 110 serves as a receive end, the terminal device 120 serves as a transmit end. The method may be applied to uplink transmission between the network device 110 and the terminal device 120, and may be applied to downlink transmission between the network device 110 and the terminal device 120. This is not limited in this embodiment of this application.

In the prior art, a fixed data distribution manner is used. For example, a modulation symbol generated through modulation is first mapped to a layer, then mapped to frequency domain, and finally mapped to time domain; and interleaving is performed in a mapping process, so as to implement decentralized distribution of data of a same CB in frequency domain. In addition, data of one CB is centralized on a specific time-domain symbol or consecutive time-domain symbols, which helps a receive end to perform fast demodulation. However, in some application scenarios, the receive end may need to perform fast demodulation on data sent by a transmit end. In other application scenarios, the receive end may not need to perform fast demodulation on the data, but requires high data transmission performance. Because the existing data distribution manner is not flexible, once the application scenario is changed, the existing data distribution manner cannot meet a different service requirement well when the network device 110 and the terminal device 120 perform data transmission.

However, according to the data transmission method in this embodiment of this application, the network device 110 determines the data distribution manner based on different service requirements or application scenarios, and can flexibly configure the data distribution manner used for performing data transmission between the network device 110 and the terminal device 120, so as to select a data distribution manner suitable for a current scenario or service requirement, thereby better meeting different service requirements of the receive end.

In an optional embodiment, FIG. 3 shows another data transmission method 300 according to an embodiment of this application. The method 300 includes:

S310. A network device 110 determines a demodulation reference signal DMRS attribute based on a service requirement or an application scenario of the terminal device 120, where the DMRS attribute is corresponding to a data distribution manner, the DMRS attribute is a DMRS pattern, a DMRS port number, or a quantity of OFDM symbols occupied by the DMRS signal to which the DMRS attribute belongs, and the data distribution manner is used to indicate distribution of data of a same code block on at least one time-domain symbol.

S320. The network device 110 sends the DMRS attribute to the terminal device 120.

Correspondingly, the terminal device 120 receives the DMRS attribute sent by the network device 110.

S330. The terminal device 120 determines, based on the DMRS attribute, a data distribution manner used for performing data transmission with the network device 110.

After the terminal device 120 determines the data distribution manner, the terminal device 120 performs data transmission with the network device 110 based on the data distribution manner.

Specifically, the network device 110 and the terminal device 120 need to determine the demodulation reference signal (DMRS) pattern or the DMRS port number when performing data transmission. Therefore, in this embodiment of this application, the DMRS pattern or the DMRS port number is collectively referred to as the DMRS attribute, and the DMRS attribute is bound to the data distribution manner configured by the network device 110, that is, different DMRS attributes are corresponding to different data distribution manners. In this way, the network device 110 notifies the terminal device 120 of the DMRS attribute that is used during data transmission with the terminal device 120. The terminal device 120 may determine, based on the DMRS attribute, the data distribution manner used for performing data transmission with the network device 110, so as to send data to the network device 110 based on the data distribution manner or receive, based on the data distribution manner, data sent by the network device 110.

It should be understood that the network device 110 may send the DMRS attribute to the terminal device 120 by using various signaling, for example, downlink control information (DCI), radio resource control (RRC) signaling, and a Media Access Control (MAC) layer control element (CE). This is not limited in this embodiment of this application.

Specifically, the network device 110 and the terminal device 120 may determine the data distribution manner based on a preset first correspondence. Different DMRS patterns are corresponding to different mapping manners, or different DMRS port numbers are corresponding to different mapping manners. The DMRS pattern or the DMRS port number used when the network device 110 and the terminal device 120 perform data transmission is known, for example, a first DMRS pattern or a first DMRS port number. Therefore, the transmit end and the receive end may determine, from a plurality of data distribution manners based on the first DMRS pattern or the first DMRS port number, a data distribution manner corresponding to the first DMRS pattern or the first DMRS port number. For example, the network device 110 and the terminal device 120 may agree that a port number x1-y1 indicates that the port number is corresponding to a time-domain centralized data distribution manner, and a port number x2-y2 indicates that the port number is corresponding to a time-domain decentralized data distribution manner. However, this is not limited in this embodiment of this application.

It should be understood that the DMRS attribute may be a scrambling code or an orthogonal sequence of the DMRS in addition to the DMRS pattern, the DMRS port number, or the quantity of OFDM symbols occupied by the DMRS signal to which the DMRS attribute belongs. This is not limited in this embodiment of this application.

Figure 4:
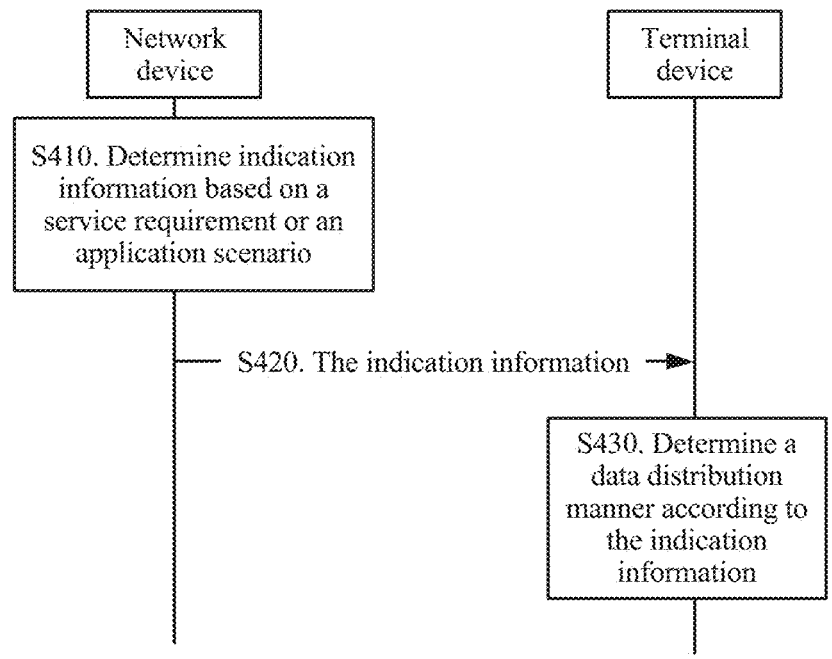
FIG. 4 is a schematic flowchart of another data transmission method according to an embodiment of this application.

In an optional embodiment, FIG. 4 shows another data transmission method 400 according to an embodiment of this application. The method 400 includes:

S410. A network device 110 may determine indication information based on a service requirement or an application scenario of a terminal device 120, where the indication information is used to indicate a data distribution manner, and the data distribution manner is used to indicate distribution of data of a same code block on at least one time-domain symbol.

S420. The network device 110 sends the indication information to the terminal device 120.

Correspondingly, the terminal device 120 receives the indication information sent by the network device 110.

S430. The terminal device 120 determines, according to the indication information, a data distribution manner used for performing data transmission with the network device 110.

After the terminal device 120 determines the data distribution manner, the terminal device 120 performs data transmission with the network device 110 based on the data distribution manner.

Specifically, the network device 110 may directly notify, by using the indication information, the terminal device 120 of the data distribution manner used for performing data transmission with the terminal device 120. The terminal device 120 may directly determine, according to the indication information, the data distribution manner used for performing data transmission with the network device 110, so as to send data to the network device 110 based on the data distribution manner, or receive, based on the data distribution manner, data sent by the network device 110.

In an optional embodiment, the indication information is any one of the following information: downlink control information DCI, radio resource control RRC signaling, and a Media Access Control MAC layer control element CE.

It should be understood that the network device 110 may send the indication information to the terminal device 120 by using other signaling than the foregoing three types of signaling. This is not limited in this embodiment of this application.

In an optional embodiment, the data distribution manner is a time-domain decentralization manner or a time-domain centralization manner, the time-domain decentralization manner is used to indicate that data from a same code block is de-centrally distributed on a plurality of time-domain symbols, and the time-domain centralization manner is used to indicate that data from a same code block is centrally distributed on at least one consecutive time-domain symbol.

Specifically, the data distribution manner may be the time-domain decentralization manner or the time-domain centralization manner. The time-domain decentralization manner indicates that data from a same code block is de-centrally distributed in time domain, and the time-domain centralization manner indicates that data from a same code block is centrally distributed in time domain. A receive end may perform fast demodulation on data distributed in the time-domain centralization manner, so as to meet an application scenario in which data needs to be fast demodulated. For data distributed in the time-domain decentralization manner, transmission reliability is higher, and transmission performance is better.

Figure 5:
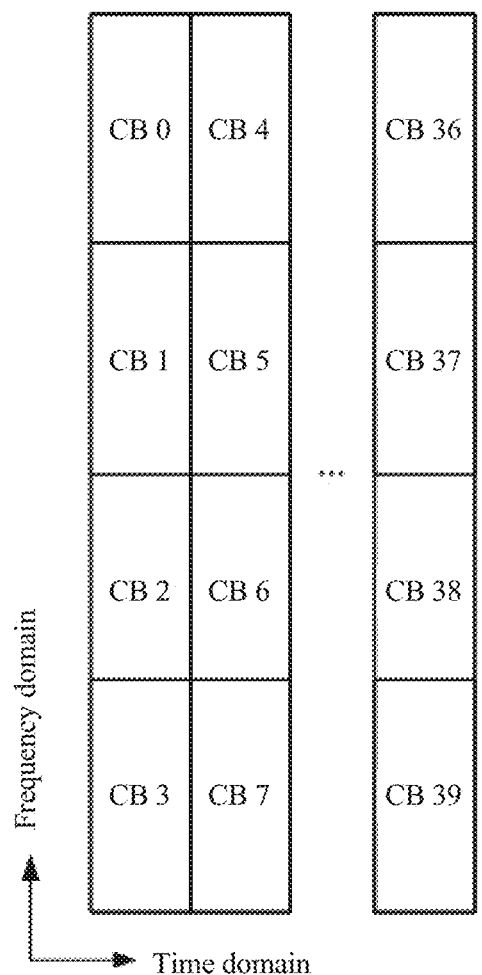
FIG. 5 is a schematic diagram of data distribution in a time-domain centralization manner according to an embodiment of this application.
Figure 6:
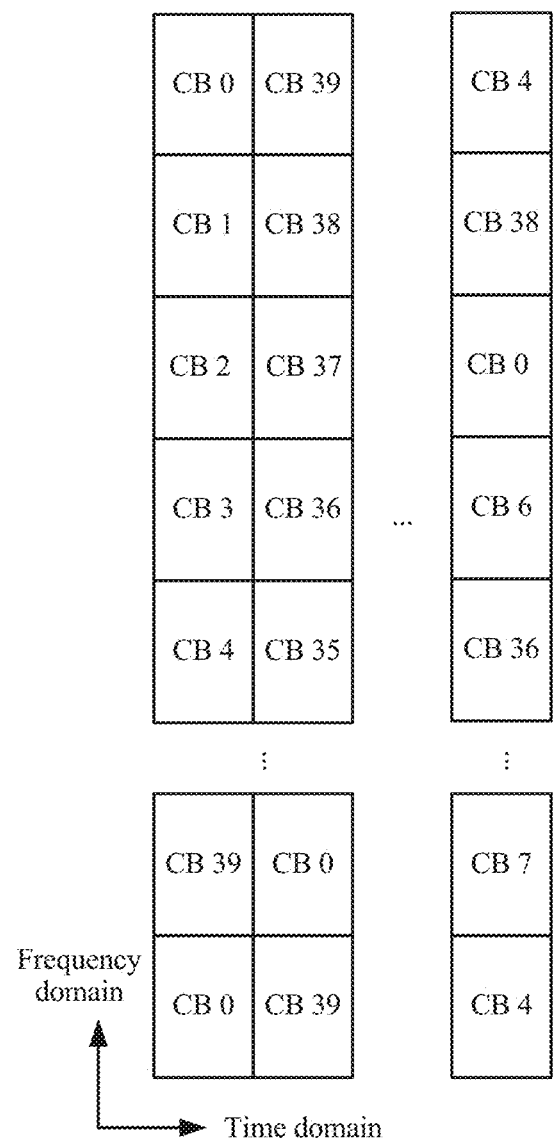
FIG. 6 is a schematic diagram of data distribution in a time-domain decentralization manner according to an embodiment of this application.

FIG. 5 is a schematic diagram of data distribution in a time-domain centralization manner according to an embodiment of this application. In FIG. 5, each CB is prioritized to be centrally distributed on one time-domain symbol or more consecutive time-domain symbols, so as to ensure that a receive end performs fast demodulation on data FIG. 6 is a schematic diagram of data distribution in a time-domain decentralization manner according to an embodiment of this application. In FIG. 6, each CB is prioritized to be de-centrally placed on different time-domain symbols, so that transmission performance can be greatly improved.

It should be understood that, in the time-domain centralization manner, data of a same CB is prioritized to be distributed on one time-domain symbol. When one time-domain symbol is not enough, remaining data of the CB is placed on a neighboring time-domain symbol, and so on. Therefore, when the time-domain centralization manner is used, the data of the same CB is distributed on at least one consecutive time-domain symbol. Although data of a same CB needs to be de-centrally placed in the time-domain decentralization manner, the data from the same CB may not be decentralized to all available time-domain symbols. For example, there are 10 available time-domain symbols in total, and one CB may be de-centrally placed on only three time-domain symbols, five time-domain symbols, or eight time-domain symbols. This should belong to the time-domain decentralization manner in this embodiment of this application.

It should be further understood that the data distribution manner reflects only final distribution of data from a same CB in time domain. This embodiment of this application imposes no limitation on distribution of the data in frequency domain and space domain. For example, when a distribution manner of to-be-sent data in time domain is the time-domain decentralization manner, data from a same CB may be de-centrally or centrally distributed in space and/or frequency domain. A case in the time-domain centralization manner is the same. This is not limited in this embodiment of this application.

It should be understood that the time-domain centralization manner and the time-domain decentralization manner may produce different results when the network device 110 uses different processing manners for the to-be-sent data. This is not limited in this embodiment of this application.

In an optional embodiment, the time-domain centralization manner is used to indicate that in all code blocks, time-domain symbol indexes of first data and second data whose initial location indexes meet $x_1<x_2$ meet $n_1 \le n_2$;

$x_2$ is the initial location index of the first data, $x_2$ is the initial location index of the second data, $n_1$ is the time-domain symbol index of the first data, and $n_2$ is the time-domain symbol index of the second data;

the time-domain decentralization manner is used to indicate that there is a first code block, and in the first code block, time-domain symbol indexes of third data and fourth data whose initial location indexes meet $x_1<x_4$ meet $n_3>n_4$; and $x_3$ is the initial location index of the third data, $x_4$ is the initial location index of the fourth data, $n_3$ is the time-domain symbol index of the third data, and $n_4$ is the time-domain symbol index of the fourth data.

Specifically, modulation symbols or bits from different CBs are not alternated. That is, in a final mapping result, on any time-domain symbol, modulation symbols or bits from one CB are placed before those of another CB are placed. It should be understood that such a result is obtained because the network device 110 does not perform bit-level interleaving or modulation-symbol-level interleaving on the to-be-sent data, but may perform CB-level interleaving. The initial location index is an index of data in a code block when no processing is performed on the code block.

Figure 7:
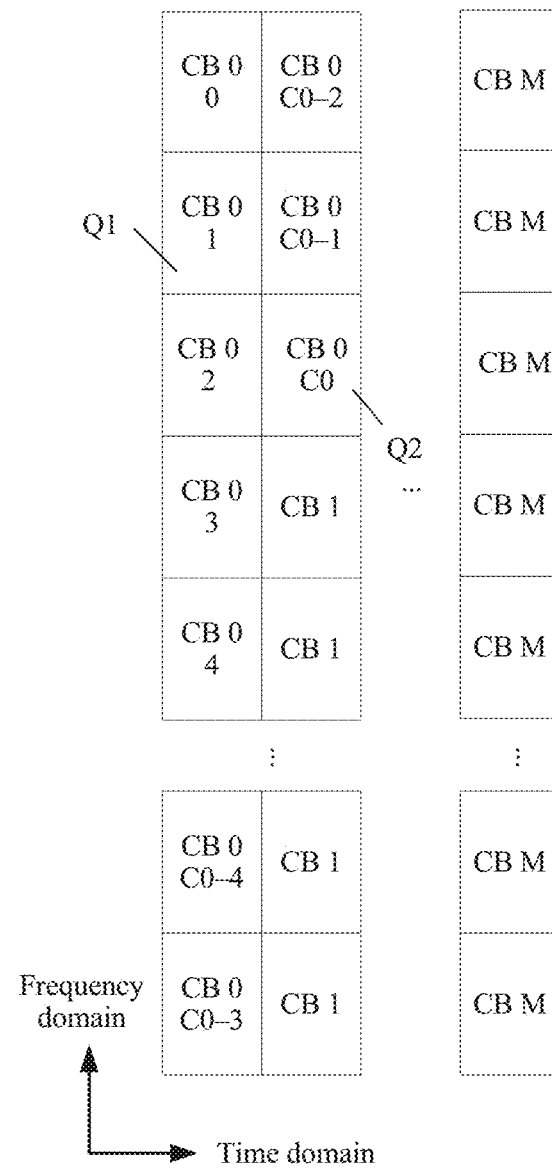
FIG. 7 is a schematic diagram of data distribution in another time-domain centralization manner according to an embodiment of this application.
Figure 8:
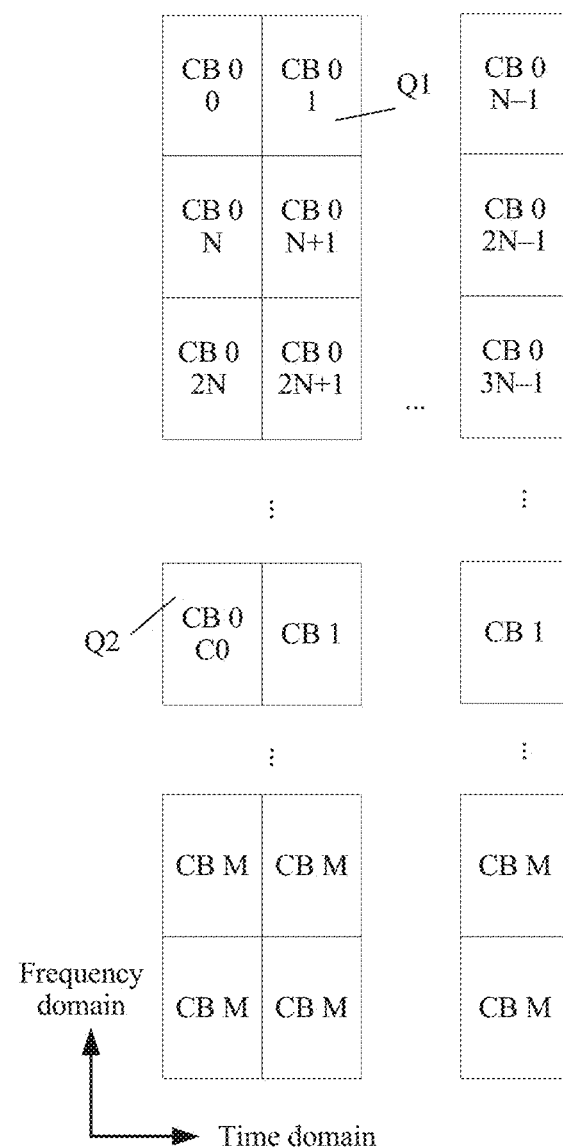
FIG. 8 is a schematic diagram of data distribution in another time-domain decentralization manner according to an embodiment of this application.

For ease of understanding, the following describes this embodiment of this application in detail with reference to FIG. 7 and FIG. 8. It is assumed that Q1 and Q2 are two pieces of data from a same CB, that is, modulation symbols or bits, location indexes of the data in the CB are $x_1$ and $x_2$ respectively, and $x_1 < x_2$. In a final mapping result, a time-domain symbol on which Q1 is located is $n_1$, and a time-domain symbol on which Q2 is located is $n_2$.

If $n_1 \leq n_2$ for any Q1 and any Q2 that meet $x_1 < x_2$ in any CB, the data distribution manner is a time-domain centralization manner, as shown in FIG. 7.

If there is a case in which $n_1 > n_2$ for Q1 and Q2 that meet $x_1 < x_2$, the data distribution manner is a time-domain decentralization manner, as shown in FIG. 8.

In an optional embodiment, the time-domain centralization manner is used to indicate that a first time-domain symbol does not include at least two first code blocks, and a maximum value of an initial location index of data that is of the first code block and that is distributed on the first time-domain symbol is not equal to a maximum value of an initial location index of data that is of the first code block and that is distributed on a resource unit. The resource unit is a basic unit used to perform resource allocation for a scheduled user, and all time-domain symbols in the resource unit are first time-domain symbols. The resource unit defined in this embodiment of the present application may be a scheduling resource. The scheduling resource includes several subcarriers in frequency domain and includes a plurality of OFDM symbols in time domain. The plurality of OFDM symbols are one subframe, one slot, or one subframe obtained after slot aggregation.

Alternatively, the time-domain decentralization manner is used to indicate that on a first time-domain symbol including data from Q code blocks, there are at least two second code blocks belonging to the Q code blocks, a maximum value of initial location indexes of data that is of the second code blocks and that is distributed on the first time-domain symbol is not equal to a maximum value of initial location indexes of data that is of the second code blocks and that is distributed on the resource unit, and Q is an integer greater than 1.

Specifically, modulation symbols or bits from different CBs may be alternated. That is, in a final mapping result, there is a time-domain symbol on which modulation symbols or bits from different CBs are alternated. It should be understood that such a result is obtained because the network device 110 performs bit-level interleaving or modulation-symbol-level interleaving on the to-be-sent data.

Figure 9:
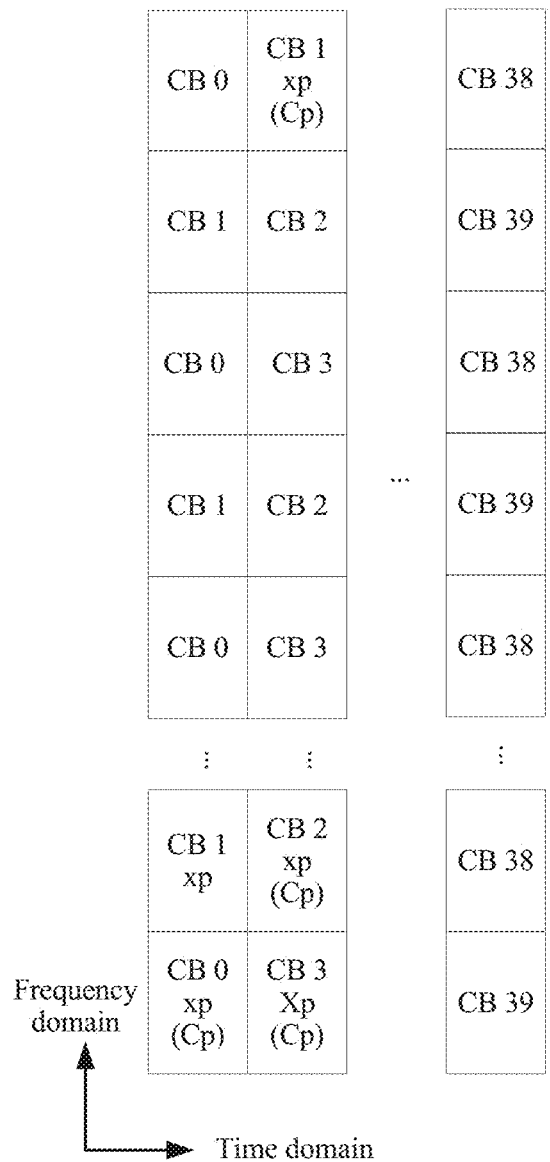
FIG. 9 is a schematic diagram of data distribution in another time-domain centralization manner according to an embodiment of this application.
Figure 10:
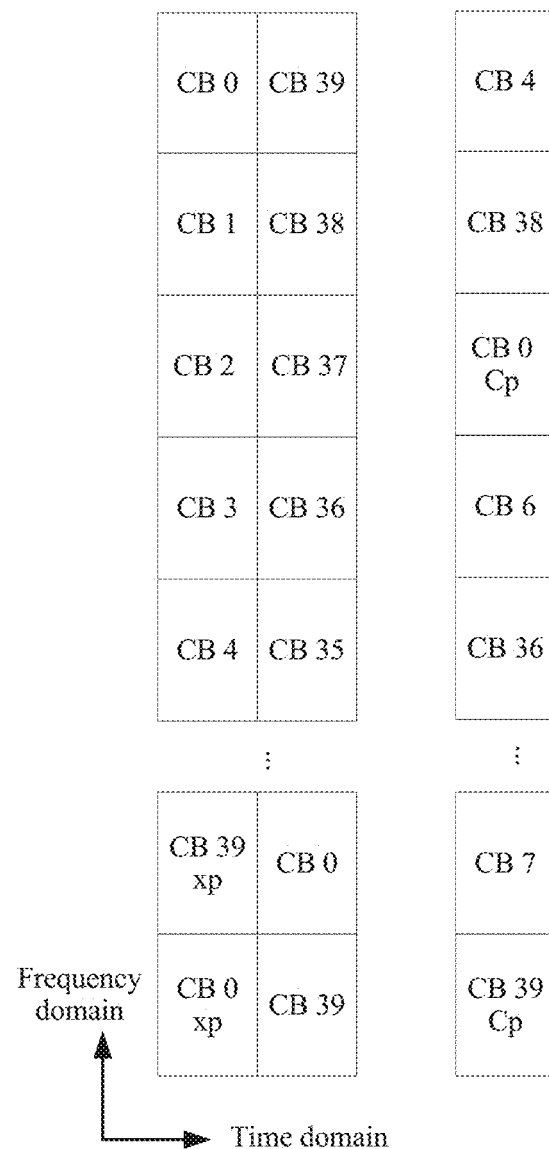
FIG. 10 is a schematic diagram of data distribution in another time-domain decentralization manner according to an embodiment of this application.

For ease of understanding, the following describes this embodiment of this application in detail with reference to FIG. 9 and FIG. 10. For a time-domain symbol that includes data from P ($P \geq 1$) different CBs, it is assumed that the data is respectively a CB 1, a CB 2, . . . , and a CB P. An initial location index corresponding to a last modulation symbol or bit of a CB p ($1 < p <= P$) in a location sequence (that is, a sequence of modulation symbols or bits in the CB before the modulation symbols or the bits are alternated) on the time-domain symbol is xp. In addition, it is assumed that an initial location index corresponding to the last modulation symbol or bit of the entire CB p is Cp (that is, an initial location index corresponding to the last modulation symbol or bit at a specific layer is Cp).

If for any time-domain symbol in which $P \geq 1$, in the P CBs, xp of at least P−1 CBs is equal to Cp, the data distribution manner is a time centralization manner, as shown in FIG. 9.

If for any time-domain symbol in which $P \leq 1$ in the P CBs, xp of less than P−1 CBs is equal to Cp, the data distribution manner is a time-domain decentralization manner, as shown in FIG. 10.

In an optional embodiment, the time-domain decentralization manner includes:

a first time-domain decentralization manner, used to indicate that data from a same code block is de-centrally distributed on all time-domain symbols in a resource unit, where the resource unit is a basic unit used to perform resource allocation for a scheduled user:

a second time-domain decentralization manner, used to indicate that data from a same code block is de-centrally distributed on all time-domain symbols of a same slot in the resource unit; and a third time-domain decentralization manner, used to indicate that data from a same code block is de-centrally distributed on N time-domain symbols in the resource unit, where N is an integer greater than 1.

Specifically, the time-domain decentralized data distribution manner may include different decentralization degrees, and the decentralization degree may be measured by using a quantity of time-domain symbols on which data from a same CB is distributed. Data from a same CB may be de-centrally distributed on all time-domain symbols in a resource unit, or may be de-centrally distributed on all time-domain symbols of a same slot in a resource unit, or may be de-centrally distributed on some time-domain symbols in a resource unit. This is not limited in this embodiment of this application. It should be understood that the resource unit (RU) may be used as a basic unit to perform resource allocation for a scheduled user. One resource unit occupies a plurality of consecutive subcarriers in frequency domain and a plurality of consecutive symbols (OFDM symbols) in time domain.

It should be understood that the network device 110 may determine, in a plurality of manners, whether the data distribution manner is the time-domain decentralization manner or the time-domain centralization manner. This is not limited in this embodiment of this application.

In an optional embodiment, if the application scenario is that a demodulation result needs to be fed back on a current resource unit, a DMRS attribute is corresponding to the time-domain centralization manner, where the resource unit is a basic unit used to perform resource allocation for a scheduled user; or if the application scenario is that a demodulation result does not need to be fed back on a current resource unit, the DMRS attribute is corresponding to the time-domain decentralization manner.

Figure 11:
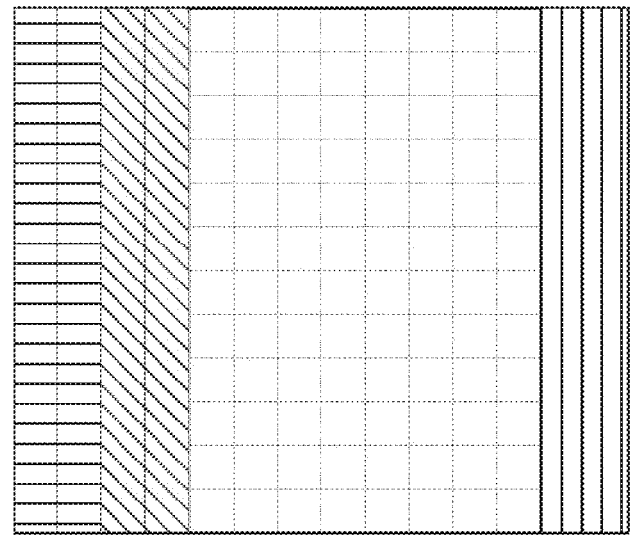
FIG. 11 is a schematic diagram of a DMRS pattern according to an embodiment of this application.
Figure 12:
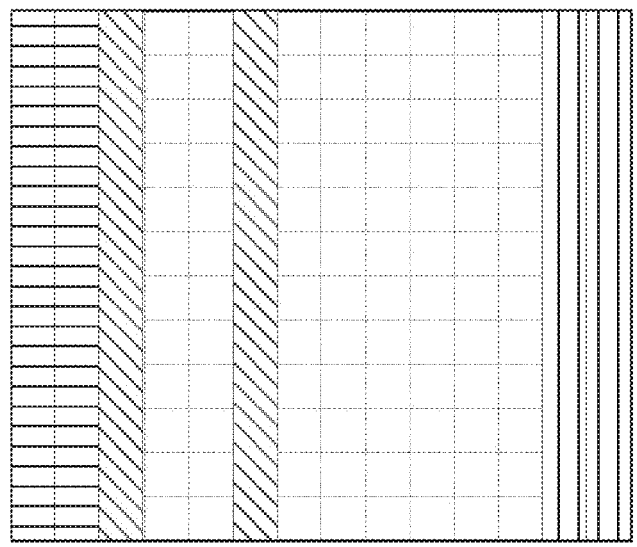
FIG. 12 is a schematic diagram of another DMRS pattern according to an embodiment of this application.
Figure 13:
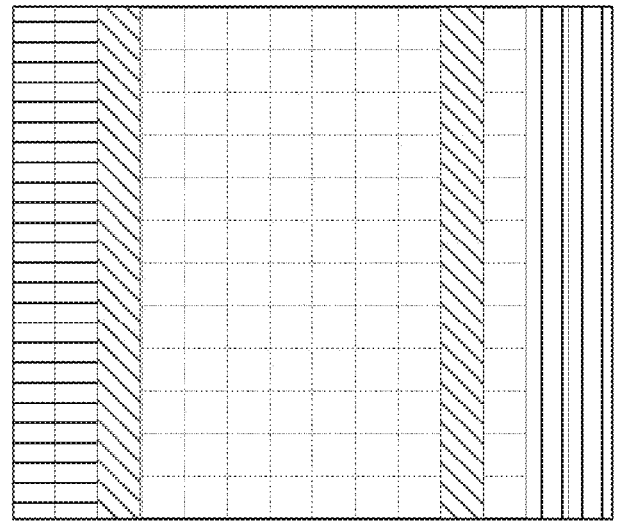
FIG. 13 is a schematic diagram of another DMRS pattern according to an embodiment of this application.
Figure 14:
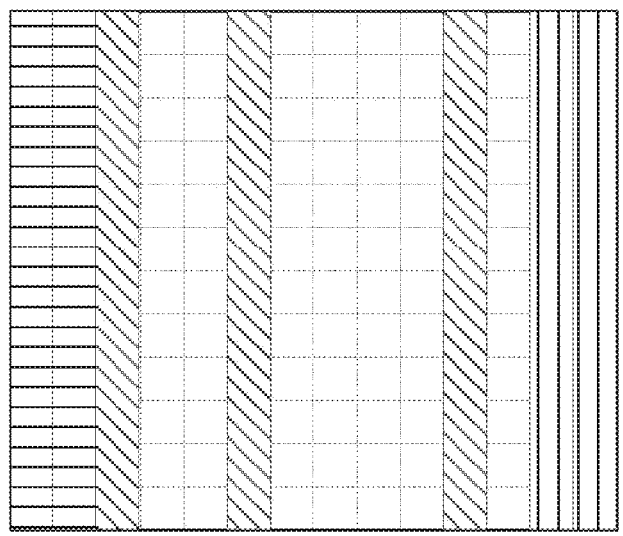
FIG. 14 is a schematic diagram of another DMRS pattern according to an embodiment of this application.

Specifically, when the demodulation result needs to be fed back on the current resource unit (which may be specifically a current frame or a current scheduling resource), the network device 110 uses a corresponding DMRS attribute. The DMRS attribute may be corresponding to the time-domain centralization manner. FIG. 11 and FIG. 12 are schematic diagrams of DMRS patterns (pattern) when a demodulation result is fed back in a current subframe. Data distribution manners corresponding to the DMRS patterns shown in FIG. 11 and FIG. 12 may be the time-domain centralization manner. On the contrary, when the demodulation result does not need to be fed back in the current frame, the network device 110 may use a corresponding DMRS attribute, and the DMRS attribute may be corresponding to the time-domain decentralization manner. FIG. 13 and FIG. 14 are schematic diagrams of DMRS patterns when a demodulation result does not need to be fed back in a current subframe. Data distribution manners corresponding to the DMRS patterns shown in FIG. 13 and FIG. 14 may be the time-domain decentralization manner.

In an optional embodiment, when the DMRS pattern is that the DMRS occupies one time-domain symbol, the DMRS pattern is corresponding to the time-domain centralization manner; or when the DMRS pattern is that the DMRS occupies at least two time-domain symbols, if there is no data transmission between any two time-domain symbols occupied by the DMRS, the DMRS pattern is corresponding to the time-domain centralization manner, or if there is data transmission between the at least two time-domain symbols occupied by the DMRS, the DMRS attribute is corresponding to the time-domain decentralization manner.

Specifically, the network device 110 has determined the DMRS pattern. When the DMRS pattern is that the DMRS occupies one time-domain symbol, the DMRS pattern is corresponding to the time-domain centralization manner. When the DMRS pattern is that the DMRS occupies at least two time-domain symbols, when there is no data transmission between any two time-domain symbols occupied by the DMRS, that is, there is no data transmission between any two time-domain symbols carrying the DMRS, the DMRS pattern may be corresponding to the time-domain centralization manner. FIG. 11 is a schematic diagram of one DMRS pattern when transmission of all DMRSs is before data transmission. A data distribution manner corresponding to the DMRS pattern shown in FIG. 11 may be the time-domain centralization manner. If there is data transmission between the at least two time-domain symbols occupied by the DMRS, that is, there is data transmission between two time-domain symbols carrying the DMRS, the DMRS pattern may be corresponding to the time-domain decentralization manner. In schematic diagrams of DMRS patterns shown in FIG. 12 to FIG. 14, there exists a case in which DMRS transmission is after data transmission. Therefore, data distribution manners corresponding to the three DMRS patterns may be the time-domain decentralization manner.

In conclusion, a correspondence between the data distribution manner and the DMRS pattern may use the following two different manners.

Figure 34:
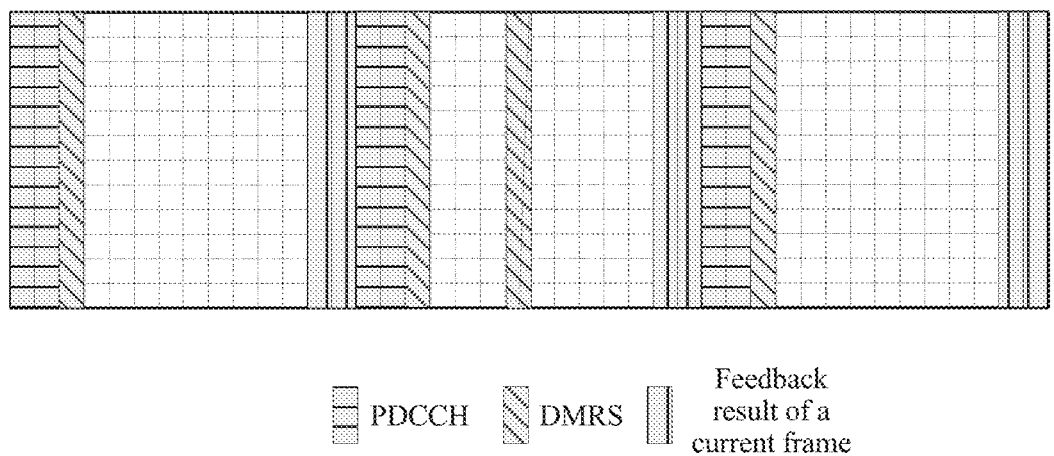
FIG. 34 is a schematic diagram of a DMRS pattern.

Manner 1: In the DMRS pattern (FIG. 11) that is applicable to a case in which there is no data transmission between transmission of any two DMRSs, the time-domain centralization manner is used; and in the DMRS patterns (FIG. 12, FIG. 13, and FIG. 14) that are applicable to a case in which there is data transmission between transmission of two DMRSs, the time-domain decentralization manner is used. As a supplement to the foregoing implementations, referring to FIG. 34, if DMRS patterns are consecutive DMRS patterns in which there is no data transmission between transmission of any two DMRSs, or if a DMRS of another pattern appears periodically or in a burst manner when a DMRS occupies only one OFDM symbol, that is, there is data transmission between transmission of two DMRSs, the time-domain centralization manner may not be switched to the time-domain decentralization manner, and the time-domain centralization manner may be always used to maintain consistency.

Manner 2: In the DMRS patterns (FIG. 11 and FIG. 12) that are applicable to a case in which a demodulation result needs to be fed back on a current resource unit, the time-domain centralization manner is used; and in the DMRS patterns (FIG. 13 and FIG. 14) that are applicable to a case in which a demodulation result does not need to be fed back on a current resource unit, the time-domain decentralization manner is used.

It should be understood that using which manner depends on the application scenario or the service requirement of the terminal device 120, and the manner is configured by the network device 110. This is not limited in this embodiment of this application.

In an optional embodiment, the method further includes the following steps:

The network device 110 determines, based on a service requirement or an application scenario of the terminal device 120, a frame structure used for performing data transmission, where the frame structure is corresponding to the data distribution manner;

correspondingly, the terminal device 120 determines, based on the frame structure used for performing data transmission with the network device 110, a data distribution manner used for performing data transmission with the network device 110, where the data distribution manner is used to indicate distribution of data of a same code block on at least one time-domain symbol; and the terminal device 120 performs data transmission with the network device 110 based on the data distribution manner.

It should be understood that the frame structure may be pre-agreed by the network device 110 and the terminal device 120, or the network device 110 sends indication information to the terminal device 120, to indicate the frame structure used for subsequent data transmission. This is not limited in this embodiment of this application.

In an optional embodiment, if the application scenario of the terminal device 120 is that a demodulation result needs to be fed back on a current resource unit, the frame structure is corresponding to the time-domain centralization manner, where the resource unit is a basic unit used to perform resource allocation for a scheduled user; or if the application scenario of the terminal device 120 is that a demodulation result does not need to be fed back on a current resource unit, the frame structure is corresponding to the time-domain decentralization manner.

Specifically, the network device 110 may directly determine, based on the service requirement or the application scenario of the terminal device 120, the to-be-used frame structure, and determine a correspondence between the frame structure and the data distribution manner. If the demodulation result needs to be fed back on the current resource unit, the frame structure may be corresponding to the time-domain centralization manner. If the demodulation result does not need to be fed back on the current resource unit, the frame structure may be corresponding to the time-domain decentralization manner.

The following table summarizes the data distribution manner.

TABLE 1

| Data distribution manner | Mapping manner | Interleaving manner |
|---|---|---|
| (1) Time-domain centralized distribution manner 1 | Frequency-domain mapping is preferentially performed, and then time-domain mapping is performed. | No interleaving |
| (2) Time-domain centralized distribution manner 2 | Frequency-domain mapping is preferentially performed, and then time-domain mapping is performed. | Frequency-domain interleaving |
| (3) Time-domain decentralized distribution manner 1 | Frequency-domain mapping is preferentially performed, and then time-domain mapping is performed. | Time-domain interleaving |
| (4) Time-domain decentralized distribution manner 2 | Frequency-domain mapping is preferentially performed, and then time-domain mapping is performed. | Time-frequency interleaving |
| (5) Time-domain decentralized distribution manner 3 | Time-domain mapping is preferentially performed, and then frequency-domain mapping is performed. | No interleaving |
| (6) Time-domain decentralized distribution manner 4 | Time-domain mapping is preferentially performed, and then frequency-domain mapping is performed. | Frequency-domain interleaving |
| (7) Time-domain decentralized distribution manner 5 | Time domain mapping is preferentially performed, and then frequency-domain mapping is performed. | Time-domain interleaving |
| (8) Time-domain decentralized distribution manner 6 | Time-domain mapping is preferentially performed, and then frequency-domain mapping is performed. | Time-frequency interleaving |

Figure 23:
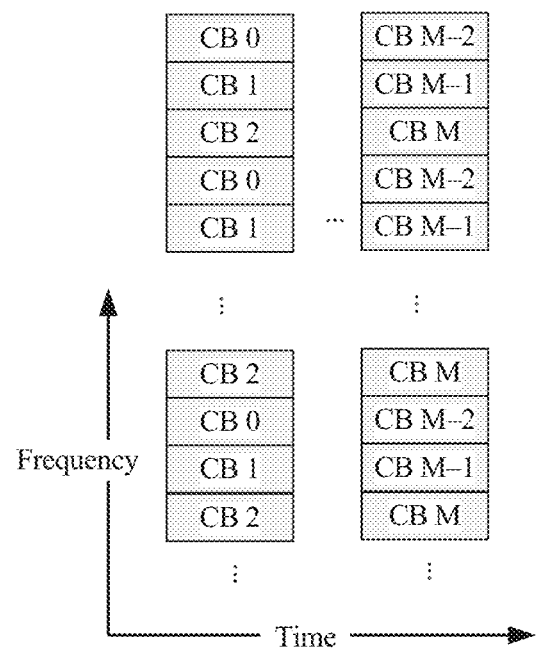
FIG. 23 is a schematic diagram of frequency-domain interleaving according to an embodiment of this application.

No interleaving is performed on code blocks in some data distribution manners in Table 1. Alternatively, a manner of frequency-domain interleaving, time-domain interleaving, or time-frequency interleaving is used. Frequency-domain interleaving means that data of one code block and data of another code block are interleaved on one OFDM symbol. That is, interleaving is performed in frequency domain of one OFDM symbol. Referring to FIG. 23, for example, data of a CB 0 is divided into a plurality of parts, which are all distributed on a same OFDM symbol. In frequency-domain interleaving, the CB may also be on two or more symbols. A characteristic is that during frequency-domain interleaving, modulation symbols from CBs are kept on OFDM symbols before interleaving.

Figure 24:
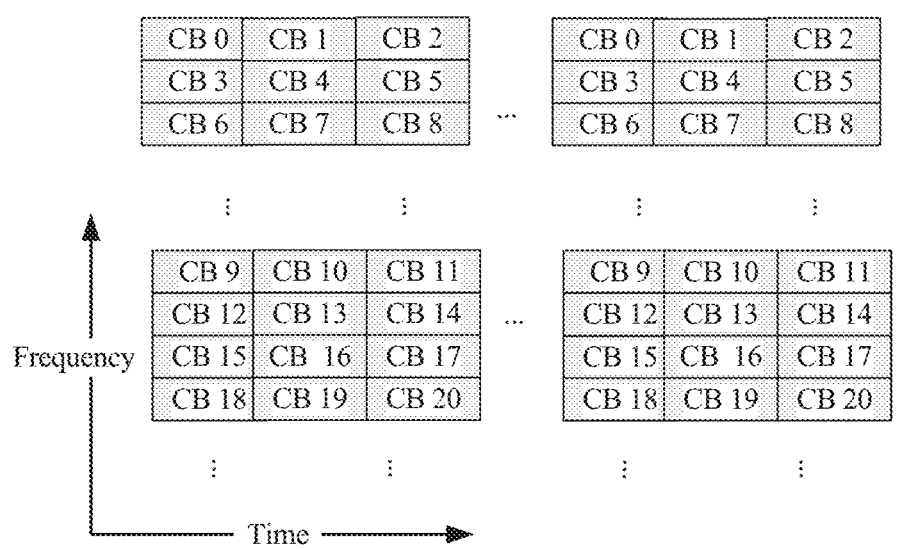
FIG. 24 is a schematic diagram of time-domain interleaving according to an embodiment of this application.
Figures 25, 26:
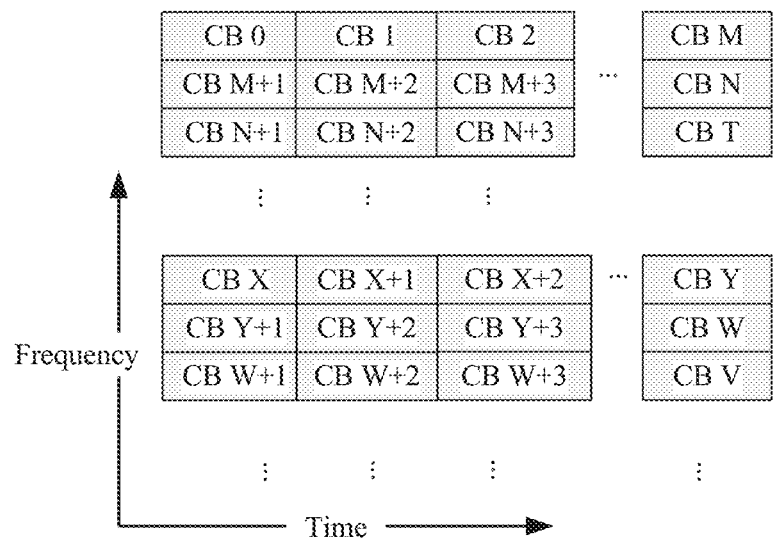
FIG. 25 is a schematic diagram of time-frequency interleaving according to an embodiment of this application.
FIG. 26 is a schematic diagram of preferred time-domain mapping according to an embodiment of this application.

Time-domain interleaving means that data of one code block and data of another code block are interleaved on subcarriers having a same frequency in a plurality of OFDM symbols. As shown in FIG. 24, data of one code block is distributed on a plurality of OFDM symbols through time-domain interleaving. An interleaving range of time-domain interleaving may be two or more time-domain symbols or may be one slot. In a slot aggregation scenario, the interleaving range may also be a plurality of slots after aggregation. In a wireless system that uses a code block group (CBG), time-domain interleaving may be within one CBG In time-frequency interleaving, data of one code block is interleaved with data of another code block both in frequency domain and time domain. As shown in FIG. 25, in the time-frequency interleaving manner, data of one code block is de-centrally distributed on a plurality of subcarriers in frequency domain and a plurality of OFDM symbols in time domain. For example, data of a code block CB0 is distributed on subcarriers with different frequencies and on different OFDM symbols. Time-frequency interleaving may also be within two or more time-domain symbols or one or more slots in time domain, or one or more aggregated slots or one CBG in a slot aggregation scenario.

In Table 1, when a data distribution manner of a code block is arranged, a manner of preferentially performing frequency-domain mapping and then time-domain mapping may be used: or a manner of preferentially performing time-domain mapping and then frequency-domain mapping is used. In the manner of preferentially performing frequency-domain mapping and then time-domain mapping, the preferentially performing does not refer to a time sequence. Instead, when distribution of data of one or more code blocks is arranged on a time-frequency resource, the data of the one or more code blocks is preferentially arranged in frequency domain of one time-domain symbol. Then, if there is remaining data, the data is arranged on a next time-domain symbol consecutive in time domain. As shown in FIG. 5, one OFDM symbol includes a CB0, a CB1, a CB2, and a CB3, and then a CB4, a CB5, a CB6, and a CB7 continue to be placed on a next OFDM symbol consecutive in time domain.

Similarly, in the manner of preferentially performing time-domain mapping and then frequency-domain mapping, the preferentially performing does not refer to a time sequence. Instead, when distribution of data of one or more code blocks is arranged on a time-frequency resource, one group of subcarriers having a same frequency on several time-domain symbols is preferentially occupied, and then a next group of subcarriers consecutive in frequency domain on the several time-domain symbols is occupied. As shown in FIG. 24, M, N, T, Y, W, and V in the figure are all positive integers. There is no interleaving between code blocks in FIG. 26. A plurality of code blocks are preferentially arranged on a group of subcarriers having a same frequency on a plurality of time-domain symbols in sequence. In this embodiment, there are M+1 time-domain symbols in total. After the first group of subcarriers is preferentially filled fully, remaining code blocks continue to be arranged in sequence on a next group of subcarriers consecutive in frequency domain on the M+1 time-domain symbols.

As shown in Table 1, combinations of different interleaving manners or no interleaving with the manner of preferentially performing frequency-domain mapping and then time-domain mapping or the manner of preferentially performing time-domain mapping and then frequency-domain mapping constitute a plurality of data distribution manners. If the manner of preferentially performing frequency-domain mapping and then time-domain mapping is used, and no interleaving is performed, it indicates the time-domain centralized distribution manner 1 in Table 1. Based on the time-domain centralized distribution manner 1, if frequency-domain interleaving is performed, it indicates the time-domain centralized distribution manner 2. Data of a code block that uses the time-domain centralized distribution manner 2 is interleaved in frequency domain of a same time-domain symbol. As shown in FIG. 23, data of a same code block, such as a CB0, a CB1, and a CB2, is centrally distributed on a same time-domain symbol, and data of the CB0 is interleaved with data of the CB1 and data of the CB2 on the time-domain symbol.

All other combination manners than the time-domain centralized distribution manners 1 and 2 are referred to as time-domain decentralized distribution manners. Specifically, if the manner of preferentially performing time-domain mapping and then frequency-domain mapping is used, and then time-domain interleaving is used, it indicates the time-domain decentralized distribution manner 1. As shown in FIG. 26, M, N, T, Y, W, and V in the figure are all positive integers. There is no interleaving between code blocks in FIG. 24. A plurality of code blocks are preferentially arranged on a group of subcarriers having a same frequency on a plurality of time-domain symbols in sequence. In this embodiment, there are M+1 time-domain symbols in total. After the first group of subcarriers is preferentially filled fully, remaining code blocks continue to be arranged in sequence on a next group of subcarriers consecutive in frequency domain on the M+1 time-domain symbols. If the time-frequency interleaving manner is subsequently used, it indicates a time-domain decentralized distribution manner. If the manner of preferentially performing frequency-domain mapping and then time-domain mapping is used, and time-frequency interleaving is performed, it indicates the time-domain decentralization manner 2. If the manner of preferentially performing time-domain mapping and then frequency-domain mapping is used, and no interleaving is performed, it indicates the time-domain decentralized distribution manner 3. If the manner of preferentially performing time-domain mapping and then frequency-domain mapping is used, and frequency-domain interleaving is performed, it indicates the time-domain decentralized distribution manner 4. If the manner of preferentially performing time-domain mapping and then frequency-domain mapping is used, and time-domain interleaving is performed, it indicates the time-domain decentralized distribution manner 5. If the manner of preferentially performing time-domain mapping and then frequency-domain mapping is used, and time-frequency interleaving is performed, it indicates the time-domain decentralized distribution manner 6.

The different data distribution manners have different characteristics, and the network device may select, based on the application scenario or the service requirement of the terminal device 120, a data distribution manner to perform data transmission with the terminal device 120. As described in the foregoing embodiment, the corresponding data distribution manner is determined based on the demodulation reference signal DMRS attribute. The terminal device 120 also determines, based on the DMRS attribute, the data distribution manner used by the network device 110, so as to perform data transmission with the network device 110. Another solution is further disclosed in the foregoing embodiment. For example, if the demodulation result needs to feed back on the current resource, the network device 110 uses the time-domain centralization manner, and conversely, uses the time-domain decentralization manner.

The network device 110 may determine, based on the DMRS attribute or another factor, to use one of the data distribution manners in Table 1, that is, the time-domain centralized distribution manner 1 or 2, or the time-domain decentralized distribution manner 1, 2, 3, 4, 5, or 6. The following adds specific factors and corresponding data distribution manners.

Supplemented solution 1: Referring to FIG. 11, when a demodulation result, namely, an ACK/NACK, needs to be fed back on a current scheduling resource or slot, the DMRS pattern is that the DMRS occupies at least two time-domain symbols, and there is no data transmission between any two time-domain symbols occupied by the DMRS, the data distribution manner (1) or (2), namely, the time-domain centralized distribution manner 1 or 2, is used. The time-domain centralized distribution manner 1 does not include interleaving, is easy to implement, and is applicable to a small bandwidth. In the time-domain centralized distribution manner 2, a frequency-domain diversity gain may be obtained through frequency-domain interleaving.

Supplemented solution 2: Referring to FIG. 12, when a demodulation result, namely, an ACK/NACK, needs to be fed back on a current scheduling resource, the DMRS pattern is that the DMRS occupies at least two time-domain symbols, and there is data transmission between any two time-domain symbols occupied by the DMRS, one of the time-domain decentralized distribution manners 1-6 is used. When the DMRS pattern is that the DMRS occupies at least two time-domain symbols, and there is data transmission between any two time-domain symbols occupied by the DMRS, it indicates that the terminal device 120 moves at a high speed, and a time diversity gain may be obtained in the time-domain decentralized distribution manner. In a possible implementation, under this condition, the time-domain centralized distribution manner 1 may also be used, considering that the ACK/NACK needs to be fed back on the current scheduling resource, and there is a fast demodulation requirement. In this case, there is data transmission between two time-domain symbols occupied by the DMRS, and channel estimation consumes time, which is not conducive to fast demodulation. Therefore, to save time, no interleaving is performed.

Supplemented solution 3: Referring to FIG. 13, when a demodulation result does not need to be fed back on a current scheduling resource, the DMRS pattern is that the DMRS occupies at least two time-domain symbols, and there is data transmission between any two time-domain symbols occupied by the DMRS, one of the time-domain decentralized distribution manners 1-6 is used. When the DMRS pattern is that the DMRS occupies at least two time-domain symbols, and there is data transmission between any two time-domain symbols occupied by the DMRS, it indicates that the terminal device 120 moves at a high speed, and a time diversity gain may be obtained through time-domain decentralization.

Figure 27:
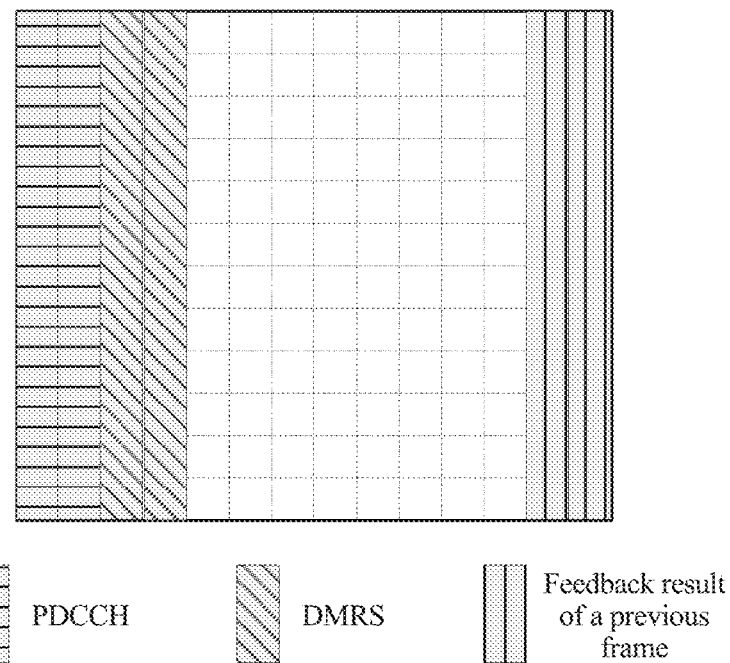
FIG. 27 is a schematic diagram of a DMRS pattern according to an embodiment of this application.

Supplemented solution 4: Referring to FIG. 27, when a demodulation result does not need to be fed back on a current scheduling resource, the DMRS pattern is that the DMRS occupies at least two time-domain symbols, and there is no data transmission between any two time-domain symbols occupied by the DMRS, one of the time-domain centralized distribution manners 1-2 is used. In this case, considering that DMRS signals are centralized, the terminal device 120 does not move fast, and a time diversity gain effect is not strong, the time-domain centralized distribution manners 1-2 are used. In a possible implementation, one of the time-domain decentralized distribution manners 1-6 may also be used. One of the time-domain decentralization manners 1-6 is used considering that although the time diversity gain is not obvious in this case, the time-domain decentralization manner may be consistent with a data distribution manner in another scenario because the demodulation result does not need to be fed back on the current scheduling resource, so as to facilitate implementation. The another scenario described herein refers to a case in which there is no data transmission between any two time-domain symbols occupied by the DMRS, when the DMRS occupies at least two time-domain symbols.

Supplemented solution 5: In addition to the DMRS attribute and the frame structure, the data distribution manner may be determined based on a channel state information reference signal (CSI-RS). Generally, when the terminal device 120 is in a high-speed moving scenario, CSI-RS density is relatively high. Therefore, in a high CSI-RS density scenario, one of the time-domain decentralized distribution manners 1-6 may be used. Therefore, in the high-speed moving scenario, a better time diversity gain may be obtained by using a time-domain decentralization manner. On the contrary, in a low CSI-RS density scenario, one of the time-domain centralized distribution manners 1-2 is used. Low density indicates that the terminal device 120 is in a low-speed moving scenario. In this scenario, a time diversity gain is not obvious, and using a time-domain centralized distribution manner facilitates fast demodulation.

Figure 28:
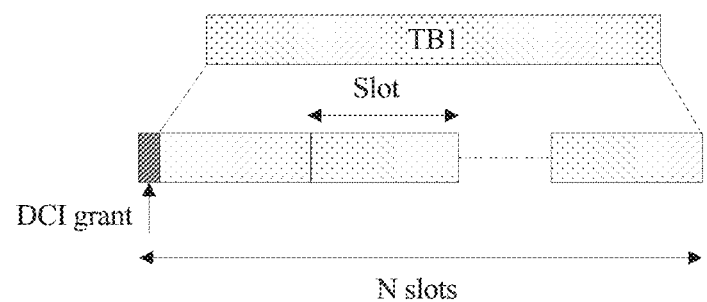
FIG. 28 is a schematic diagram of slot aggregation.
Figure 29:
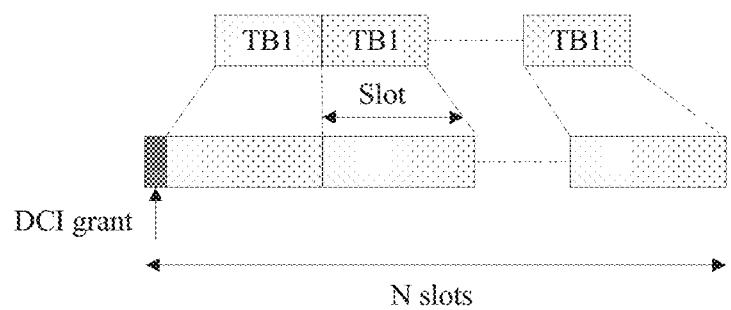
FIG. 29 is a schematic diagram of other slot aggregation.

Supplemented solution 6: The network device 110 may also determine the data distribution manner through slot aggregation configuration. Slot aggregation may include two manners. Referring to FIG. 28, one transport block (TB) is carried on a plurality of slots obtained after aggregation. Alternatively, referring to FIG. 29, a plurality of transport blocks are carried on a plurality of aggregated slots. When a demodulation result does not need to be fed back on a current scheduling resource, and slot aggregation is not performed, the network device 110 uses the time-domain centralized distribution manner 1 or 2. On the contrary, when the demodulation result does not need to be fed back on the current scheduling resource, and the slot aggregation manner is used, the network device 110 uses a time-domain decentralized distribution manner.

Supplemented solution 7: If a hybrid automatic repeat request (Hybrid Automatic Repeat reQuest, HARQ) technology is used for performing CBG-based retransmission, the time-domain centralized distribution manner 1 or 2 is used. For CBG-based HARQ retransmission, if a time-domain decentralized data distribution manner is used, once an error occurs, usually a plurality of CBGs encounter an error. Consequently, CBG-based HARQ retransmission becomes meaningless. If code word (CW)-based HARQ retransmission is performed, one of the time-domain decentralized distribution manners 1-6 is used.

Supplemented solution 8: A 5G new radio (NR) technology supports two types of carrier waveforms: direct Fourier transform spread orthogonal frequency division multiplexing (Direct Fourier Transform Spread Orthogonal Frequency Division Multiplexing, DFT-s-OFDM) and cyclic prefix orthogonal frequency division multiplexing (CP-OFDM). If the DFT-s-OFDM is used, one of the time-domain decentralized distribution manners 1-6 is used. If the CP-OFDM is used, one of the time-domain centralized distribution manners 1-2 is used.

Supplemented solution 9: One CW in NR can be mapped to four layers. The network device 110 may determine a to-be-used data distribution manner based on a quantity of layers that is corresponding to one CW. When a quantity of layers that is corresponding to one CW is 1, a data distribution manner without interleaving is used, such as the time-domain centralized distribution manner 1 or the time-domain decentralized distribution manner 3. When the quantity of layers that is corresponding to the CW is 2, 3, or 4, the time-domain centralized distribution manner 2 with frequency-domain interleaving or the time-domain decentralized distribution manner 4 with frequency-domain interleaving is used. In a possible implementation, alternatively, when the quantity of layers that is corresponding to the CW is 1 or 2, a data distribution manner without interleaving is used, such as the time-domain centralized distribution manner 1 or the time-domain decentralized distribution manner 3. When the quantity of layers that is corresponding to the CW is 3 or 4, the time-domain centralized distribution manner 2 with frequency-domain interleaving or the time-domain decentralized distribution manner 4 with frequency-domain interleaving is used. A prerequisite for obtaining a gain by using frequency-domain interleaving and time-frequency interleaving is that there are a plurality of CBs and a relatively small quantity of layers. It is less possible that there are a plurality of CBs on one OFDM symbol or several OFDM symbols, and it is more possible that there are a plurality of CBs at a plurality of layers. Therefore, no interleaving is performed when there is a relatively small quantity of layers, which is easy to implement. When there is a large quantity of layers, a gain is obtained through interleaving.

Supplemented solution 10: During data transmission, initial data transmission and data retransmission may use a same data distribution manner. In a possible embodiment, initial transmission and retransmission may also use different data distribution manners. For example, initially transmitted data uses a data distribution manner without interleaving, for example, the time-domain centralized distribution manner 1 or the time-domain decentralized distribution manner 3. Retransmitted data uses a data distribution manner with frequency-domain interleaving, for example, the time-domain centralized distribution manner 2 or the time-domain decentralized distribution manner 4. In a possible embodiment, retransmitted data may also use a time-domain interleaving manner, such as the time-domain decentralized distribution manners 1, 2, 5, and 6. If retransmission and initial transmission use a same manner, they are easy to implement. Interleaving is used for retransmission. This is because when retransmission has been performed, it indicates that a channel is under a poor condition, and interleaving is used to improve retransmission performance.

Figures 30, 31:
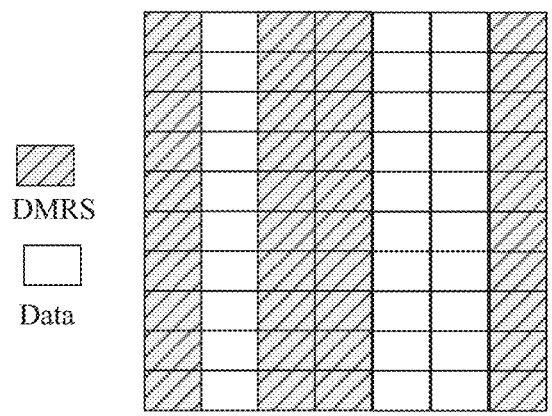
FIG. 30 is a schematic diagram of time-frequency resource distribution of a DMRS and data.
FIG. 31 is a schematic diagram of distribution of data mapped to a time-frequency resource.

Supplemented solution 11: When the DMRS occupies three or more time-domain symbols, and there is data transmission between the three or more time-domain symbols, one of the time-domain decentralized distribution manners 1-6 is used. Referring to FIG. 30, a DMRS occupies at least a first time-domain symbol, a second time-domain symbol, and a third time-domain symbol. Data is transmitted between the first time-domain symbol and the second time-domain symbol, and data is also transmitted between the second time-domain symbol and the third time-domain symbol. In addition, the first time-domain symbol, the second time-domain symbol, and the third time-domain symbol are arranged sequentially in time domain. In this case, one of the time-domain decentralized distribution manners 1-6 is used. The DMRS occupies three or more time-domain symbols, and there is data transmission between each other. It is difficult to implement fast demodulation in this case. Therefore, a time-domain decentralized data distribution manner is used to obtain a performance gain.

Supplemented solution 12: When the DMRS pattern is that the DMRS occupies at least two time-domain symbols, there is data transmission between any two time-domain symbols occupied by the DMRS, and code word (CW)-based HARQ retransmission is performed, one of the time-domain decentralized distribution manners 1-6 is used.

Supplemented solution 13: When a DMRS demodulation result is not fed back on a current scheduling resource, and code word (CW)-based HARQ retransmission is performed, one of the time-domain decentralized distribution manners 1-6 is used.

Supplemented solution 14: When a DMRS demodulation result is not fed back on a current scheduling resource, code word-based HARQ retransmission is performed, the DMRS pattern is that the DMRS occupies at least two time-domain symbols, and there is data transmission between any two time-domain symbols occupied by the DMRS, one of the time-domain decentralized distribution manners 1-6 is used.

Supplemented solution 15: When the DMRS pattern is that the DMRS occupies at least two time-domain symbols, there is data transmission between any two time-domain symbols occupied by the DMRS, and CBG-based HARQ retransmission is performed, a time-domain decentralized distribution manner is used, and a range of time-domain decentralization is within one CBG Supplemented solution 16: If a demodulation result is not fed back on a current scheduling resource, and CBG-based HARQ retransmission is performed, a time-domain decentralized distribution manner is used, and a range of time-domain decentralization is within one CBG Supplemented solution 17: When a demodulation result is not fed back on a current scheduling resource, the DMRS pattern is that the DMRS occupies at least two time-domain symbols, there is data transmission between any two time-domain symbols occupied by the DMRS, and CBG-based HARQ retransmission is performed, a time-domain decentralized distribution manner is used, and a range of time-domain decentralization is within one CBG In the foregoing plurality of solutions, for example, the supplemented solutions 1-17, the network device 110 does not need to notify the terminal device 120 of a data distribution manner by using dedicated indication information, and the terminal device 120 may obtain, based on some factors, the data distribution manner used by the network device 110. These factors include whether the demodulation result needs to be fed back on the current scheduling resource, the DMRS attribute, whether slot aggregation is performed, CSI-RS density, a data retransmission granularity, and the like in the foregoing embodiment. The terminal device 120 may obtain, from these factors, the data distribution manner used by the network device 110. In a possible embodiment, the terminal device 120 may obtain, from the foregoing factors, the data distribution manner used by the network device 110, or may determine, in combination with the indication information, the data distribution manner used by the network device 110. For example, the terminal device 120 determines, based on the foregoing factors, that a time-domain decentralized distribution manner is used. Then, the indication information may be used to instruct the terminal device to use one of the time-domain decentralization manners 1-6.

Figure 32:
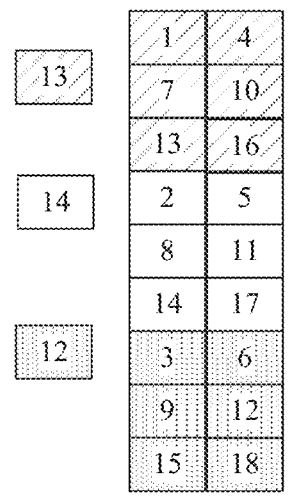
FIG. 32 is a schematic diagram of distribution of data mapped to a time-frequency resource.
Figure 33:
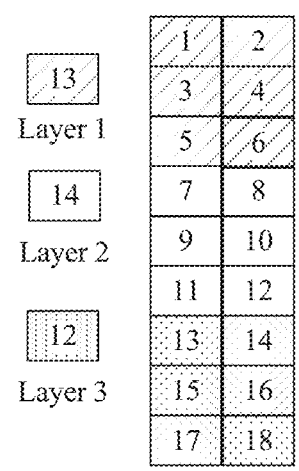
FIG. 33 is a schematic diagram of distribution of data mapped to a time-frequency resource.

In an example, data may be mapped to a time-frequency resource in three manners. The first mapping manner is first performing space mapping, then frequency-domain mapping, and finally time-domain mapping. As shown in FIG. 31, a vertical direction in the figure represents frequency domain, and a horizontal direction represents time domain. A number in each time-frequency resource unit represents a sequence of data arrangement. For example, the first data is placed on a time-frequency resource 1 of a layer 1, the second data is placed on a time-frequency resource 2 of a layer 2, the third data is placed on a time-frequency resource 3 of a layer 3, and so on. The second mapping manner is also preferentially performing space mapping, then time-domain mapping, and finally frequency-domain mapping. As shown in FIG. 32, similar to FIG. 31, a number in a time-frequency resource grid in the figure represents a sequence of data arrangement. The third mapping manner is performing data mapping in an order of first time domain, then frequency domain, and finally a layer. Referring to FIG. 33. FIG. 33 is similar to FIG. 31, and a number in a time-frequency resource grid in the figure represents a sequence of data arrangement.

In the foregoing three mapping manners, the first mapping manner is a time-domain centralization manner, and the second mapping manner and the third mapping manner are time-domain decentralization manners. The network device 110 may determine, based on the foregoing factors, whether to use a time-domain centralized data distribution manner or a time-domain decentralized data distribution manner. However, there are a plurality of time-domain decentralized distribution manners (in this embodiment, there are two time-domain decentralized distribution manners: the second mapping manner and the third mapping manner), and in this case, the network device 110 may deliver a notification to instruct the terminal device 120 to use which time-domain decentralized data distribution manner. In the supplemented solutions 1-17, when a plurality of time-domain centralized data distribution manners or a plurality of time-domain decentralized data distribution manners are available, the network device 110 and the terminal device 120 may use by default one data distribution manner through setting, or the network device 110 may deliver a notification message to instruct the terminal device 120 to use which data distribution manner.

After the data distribution manner is determined, data transmission between the network device 110 and the terminal device 120 may be classified into the following two cases.

Case 1: Downlink Transmission

In an optional embodiment, that the network device 110 performs data transmission with the terminal device 120 based on the data distribution manner includes the following: The network device 110 processes to-be-sent data based on the data distribution manner, and the network device 110 sends processed to-be-sent data to the terminal device 120.

Specifically, when the network device 110 serves as a transmit end, the network device 110 may process the to-be-sent data based on the data distribution manner, and then send the processed to-be-sent data to the terminal device 120, so that the data meets a determined distribution situation.

In an optional embodiment, that the network device 110 processes the to-be-sent data based on the data distribution manner includes the following: The network device 110 performs interleaving processing on the to-be-sent data based on the data distribution manner, where the interleaving processing includes interleaving on a bit stream of the to-be-sent data and/or interleaving on a modulation symbol of the to-be-sent data.

Specifically, before the to-be-sent data is sent, the to-be-sent data is processed through a series of steps such as channel coding, code block concatenation, modulation mapping, layer mapping, precoding, and resource mapping. In this embodiment of this application, the network device 110 may process the to-be-sent data, and may perform bit-level interleaving or symbol-level interleaving on the to-be-sent data. This is not limited in this embodiment of this application.

Specifically, the network device 110 may perform processing according to any one or more of the following steps. This is not limited in this embodiment of this application.

(1) After the network device 110 performs channel coding on the to-be-sent data, a code block is generated. In this case, the to-be-sent data is in a form of a bit stream, and the network device 110 may select, based on the data distribution manner, an interleaving manner corresponding to the data distribution manner to interleave the bit stream of the to-be-sent data. For example, if the data distribution manner is a time-domain centralization manner, the network device 110 may interleave the bit stream of the to-be-sent data, so that data of a same code block can be centrally distributed in time domain after resource mapping is performed on the to-be-sent data. If the data distribution manner is a time-domain decentralization manner, the network device 110 may interleave the bit stream of the to-be-sent data, so that data of a same code block can be de-centrally distributed in time domain after resource mapping is performed on the to-be-sent data. There are various specific interleaving manners. This is not limited in this embodiment of this application.

(2) After the network device 110 performs modulation mapping on the to-be-sent data, a modulation symbol is generated. The network device 110 may select, based on the data distribution manner, an interleaving manner corresponding to the data distribution manner to interleave the modulation symbol of the to-be-sent data. For example, if the data distribution manner is a time-domain centralization manner, the network device 110 may interleave the modulation symbol of the to-be-sent data, so that data of a same code block can be centrally distributed in time domain after resource mapping is performed on the to-be-sent data. If the data distribution manner is a time-domain decentralization manner, the network device 110 may interleave the modulation symbol of the to-be-sent data, so that data of a same code block can be de-centrally distributed in time domain after resource mapping is performed on the to-be-sent data.

(3) After the network device 110 performs layer mapping on the to-be-sent data, the network device 110 may select, based on the data distribution manner, an interleaving manner corresponding to the data distribution manner to interleave the modulation symbol of the to-be-sent data. For example, if the data distribution manner is a time-domain centralization manner, the network device 110 may interleave the modulation symbol of the to-be-sent data, so that data of a same code block can be centrally distributed in time domain after resource mapping is performed on the to-be-sent data. If the data distribution manner is a time-domain decentralization manner, the network device 110 may interleave the modulation symbol of the to-be-sent data, so that data of a same code block can be de-centrally distributed in time domain after resource mapping is performed on the to-be-sent data.

It should be understood that, because bit-level interleaving and symbol-level interleaving are respectively corresponding to different computing complexity, and different terminal devices 120 have different capabilities, if computing complexity is excessively high, the terminal device 120 may be unable to correctly receive the data sent by the network device 110. Therefore, using which one of the foregoing specific interleaving manners by the network device 110 depends on a de-interleaving capability of the terminal device 120.

In a possible implementation, the terminal device 120 may report its capability information to the network device 110, and the network device 110 may select, based on the capability information of the terminal device 120, an interleaving manner that matches a capability of the terminal device 120. This is not limited in this embodiment of this application.

In an optional embodiment, that the network device 110 processes the to-be-sent data based on the data distribution manner includes the following: The network device 110 performs resource mapping on the to-be-sent data by using a resource mapping rule corresponding to the data distribution manner based on the data distribution manner.

Specifically, when performing resource mapping on the to-be-sent data, the network device 110 may select the resource mapping rule corresponding to the data distribution manner based on the data distribution manner, so as to perform resource mapping on the to-be-sent data. For example, if the data distribution manner is the time-domain centralization manner, the network device 110 may select a resource mapping manner that can produce an effect that data of a same code block is centrally distributed in time domain. If the data distribution manner is the time-domain decentralization manner, the network device 110 may select a resource mapping manner that can produce an effect that data of a same code block is de-centrally distributed in time domain.

Correspondingly, because the terminal device 120 may determine the data distribution manner, the terminal device 120 directly receives, based on the data distribution manner, the data sent by the network device 110.

Case 2: Uplink Transmission

In an optional embodiment, that the terminal device 120 performs data transmission with the network device 110 based on the data distribution manner includes the following:

The terminal device 120 processes to-be-sent data based on the data distribution manner; and the terminal device 120 sends processed to-be-sent data to the network device 110.

Likewise, when the terminal device 120 serves as a transmit end, the terminal device 120 may process the to-be-sent data based on the data distribution manner, and then send the processed to-be-sent data to the network device 110, so that the data meets a determined distribution situation.

In an optional embodiment, that the terminal device 120 processes to-be-sent data based on the data distribution manner includes the following:

The terminal device 120 performs interleaving processing on the to-be-sent data based on the data distribution manner, where the interleaving processing includes interleaving on a bit stream of the to-be-sent data and/or interleaving on a modulation symbol of the to-be-sent data.

In an optional embodiment, that the terminal device 120 processes to-be-sent data based on the data distribution manner includes the following:

The terminal device 120 performs resource mapping on the to-be-sent data by using a resource mapping rule corresponding to the data distribution manner based on the data distribution manner.

It should be understood that, processing performed by the terminal device 120 serving as a transmit end on the to-be-sent data is the same as processing performed by the network device 110 serving as a transmit end on the to-be-sent data. Details are not described herein.

It should be further understood that sequence numbers of the foregoing processes do not mean execution sequences. The execution sequences of the processes should be determined based on functions and internal logic of the processes, and should not be construed as any limitation on the implementation processes of this embodiment of this application.

The foregoing describes in detail the data transmission methods according to the embodiments of this application with reference to FIG. 1 to FIG. 14. The following describes in detail data transmission apparatuses according to the embodiments of this application with reference to FIG. 15 to FIG. 22.

Figure 15:
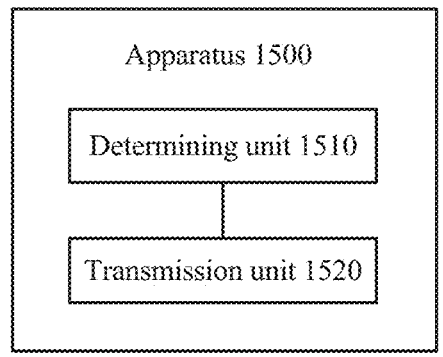
FIG. 15 is a schematic block diagram of a data transmission apparatus according to an embodiment of this application.

FIG. 15 shows a data transmission apparatus 1500 according to an embodiment of this application. The apparatus 1500 includes:

a determining unit 1510, configured to determine, based on a service requirement or an application scenario of a terminal device 120, a data distribution manner used for performing data transmission with the terminal device 120, where the data distribution manner is used to indicate distribution of data of a same code block on at least one time-domain symbol: and a transmission unit 1520, configured to perform data transmission with the terminal device 120 based on the data distribution manner.

According to the data transmission apparatus in this embodiment of this application, a network device 110 determines the data distribution manner based on different service requirements or application scenarios, so that the data distribution manner for data transmission between the network device 110 and the terminal device 120 can be flexibly configured, so as to meet different service requirements of a receive end.

Optionally, the data distribution manner is a time-domain decentralization manner or a time-domain centralization manner, the time-domain decentralization manner is used to indicate that data from a same code block is de-centrally distributed on a plurality of time-domain symbols, and the time-domain centralization manner is used to indicate that data from a same code block is centrally distributed on at least one consecutive time-domain symbol.

Optionally, the time-domain centralization manner is used to indicate that in all code blocks, time-domain symbol indexes of first data and second data whose initial location indexes meet $x_1<x_2$ meet $n_1 \leq n_2$. The initial location index is a location number of the data in the code block, and represents a location of the data in the code block.

$x_1$ is the initial location index of the first data, $x_2$ is the initial location index of the second data, $n_1$ is the time-domain symbol index of the first data, and $n_2$ is the time-domain symbol index of the second data;

the time-domain decentralization manner is used to indicate that there is a first code block, and in the first code block, time-domain symbol indexes of third data and fourth data whose initial location indexes meet $x_3<x_4$ meet $n_3>n_4$; and $x_3$ is the initial location index of the third data, $x_4$ is the initial location index of the fourth data, $n_3$ is the time-domain symbol index of the third data, and $n_4$ is the time-domain symbol index of the fourth data.

Optionally, the time-domain centralization manner is used to indicate that a first time-domain symbol does not include at least two first code blocks, and a maximum value of an initial location index of data that is of the first code block and that is distributed on the first time-domain symbol is not equal to a maximum value of an initial location index of data that is of the first code block and that is distributed on a resource unit, where the resource unit is a basic unit used to perform resource allocation for a scheduled user, and all time-domain symbols in the resource unit are first time-domain symbols; or the time-domain decentralization manner is used to indicate that on a first time-domain symbol including data from Q code blocks, there are at least two second code blocks belonging to the Q code blocks, a maximum value of initial location indexes of data that is of the second code blocks and that is distributed on the first time-domain symbol is not equal to a maximum value of initial location indexes of data that is of the second code blocks and that is distributed on the resource unit, and Q is an integer greater than 1.

Optionally, the time-domain decentralization manner includes:

a first time-domain decentralization manner, used to indicate that data from a same code block is de-centrally distributed on all time-domain symbols in a resource unit, where the resource unit is a basic unit used to perform resource allocation for a scheduled user:

a second time-domain decentralization manner, used to indicate that data from a same code block is de-centrally distributed on all time-domain symbols of a same slot in the resource unit; and a third time-domain decentralization manner, used to indicate that data from a same code block is de-centrally distributed on N time-domain symbols in the resource unit, where N is an integer greater than 1.

Optionally, the determining unit 1510 is further configured to determine a demodulation reference signal DMRS attribute based on a service requirement or an application scenario of the terminal device 120, where the DMRS attribute is corresponding to the data distribution manner, and the DMRS attribute is a DMRS pattern, a DMRS port number, or a quantity of OFDM symbols occupied by the DMRS signal to which the DMRS attribute belongs; and the transmission unit 1520 is further configured to send the DMRS attribute to the terminal device 120.

If the application scenario is that a demodulation result needs to be fed back on a current resource unit, the DMRS attribute is corresponding to the time-domain centralization manner, where the resource unit is a basic unit used to perform resource allocation for a scheduled user; or if the application scenario is that a demodulation result does not need to be fed back on a current resource unit, the DMRS attribute is corresponding to the time-domain decentralization manner.

Optionally, when the DMRS pattern is that the DMRS occupies one time-domain symbol, the DMRS pattern is corresponding to the time-domain centralization manner; or when the DMRS pattern is that the DMRS occupies at least two time-domain symbols, if there is no data transmission between any two time-domain symbols occupied by the DMRS, the DMRS pattern is corresponding to the time-domain centralization manner, or if there is data transmission between the at least two time-domain symbols occupied by the DMRS, the DMRS attribute is corresponding to the time-domain decentralization manner.

Optionally, the determining unit is further configured to:

determine, based on a service requirement or an application scenario of the terminal device 120, a frame structure used for performing data transmission, where the frame structure is corresponding to the data distribution manner.

Optionally, if the application scenario of the terminal device 120 is that a demodulation result needs to be fed back on a current resource unit, the frame structure is corresponding to the time-domain centralization manner, where the resource unit is a basic unit used to perform resource allocation for a scheduled user; or if the application scenario of the terminal device 120 is that a demodulation result does not need to be fed back on a current resource unit, the frame structure is corresponding to the time-domain decentralization manner.

Optionally, the transmission unit 1520 is further configured to send indication information to the terminal device 120, where the indication information is used to indicate the data distribution manner.

Optionally, the indication information is any one of the following information: downlink control information DCI, radio resource control RRC signaling, and a Media Access Control MAC layer control element CE.

Optionally, the apparatus further includes a processing unit, configured to process to-be-sent data based on the data distribution manner, and the transmission unit 1520 is specifically configured to send processed to-be-sent data to the terminal device 120.

Optionally, the processing unit is specifically configured to perform interleaving processing on the to-be-sent data based on the data distribution manner, where the interleaving processing includes interleaving on a bit stream of the to-be-sent data and/or interleaving on a modulation symbol of the to-be-sent data.

Optionally, the processing unit is specifically configured to perform resource mapping on the to-be-sent data by using a resource mapping rule corresponding to the data distribution manner based on the data distribution manner.

Optionally, the transmission unit 1520 is further configured to receive, based on the data distribution manner, data sent by the terminal device 120.

It should be understood that the apparatus 1500 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component that supports the described functions. In an optional example, a person skilled in the art may understand that the apparatus 1500 may be specifically the network device 110 in the foregoing embodiments, and the apparatus 1500 may be configured to perform procedures and/or steps that are corresponding to the network device 110 in the foregoing method embodiments. To avoid repetition, details are not described herein.

Figure 16:
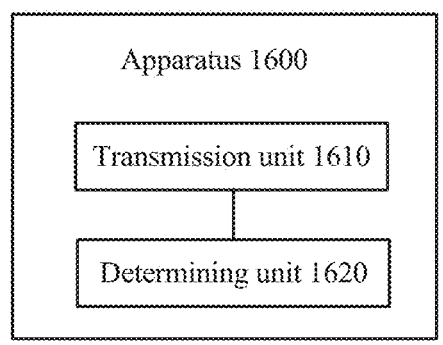
FIG. 16 is a schematic block diagram of another data transmission apparatus according to an embodiment of this application.

FIG. 16 shows a data transmission apparatus 1600 according to an embodiment of this application. The apparatus 1600 includes:

a transmission unit 1610, configured to receive indication information sent by a network device 110, where the indication information is used to indicate a data distribution manner used for performing data transmission by the terminal device 120 with the network device 110, and the data distribution manner is used to indicate distribution of data of a same code block on at least one time-domain symbol: and a determining unit 1620, configured to determine the data distribution manner according to the indication information: where the transmission unit 1610 is further configured to:

perform data transmission with the network device 110 based on the data distribution manner.

According to the data transmission apparatus in this embodiment of this application, the data distribution manner used for data transmission between the network device 110 and the terminal device 120 can be flexibly configured, so as to meet different service requirements of a receive end.

Optionally, the data distribution manner is a time-domain decentralization manner or a time-domain centralization manner, the time-domain decentralization manner is used to indicate that data from a same code block is de-centrally distributed on a plurality of time-domain symbols, and the time-domain centralization manner is used to indicate that data from a same code block is centrally distributed on at least one consecutive time-domain symbol.

Optionally, the time-domain centralization manner is used to indicate that in all code blocks, time-domain symbol indexes of first data and second data whose initial location indexes meet $x_1 < x_2$ meet $n_1 \le n_2$;

$x_1$ is the initial location index of the first data, $x_2$ is the initial location index of the second data, $n_1$ is the time-domain symbol index of the first data, and $n_2$ is the time-domain symbol index of the second data;

the time-domain decentralization manner is used to indicate that there is a first code block, and in the first code block, time-domain symbol indexes of third data and fourth data whose initial location indexes meet $x_3 < x_4$ meet $n_3 > n_4$; and $x_3$ is the initial location index of the third data, $x_4$ is the initial location index of the fourth data, $n_3$ is the time-domain symbol index of the third data, and $n_4$ is the time-domain symbol index of the fourth data.

Optionally, the time-domain centralization manner is used to indicate that a first time-domain symbol does not include at least two first code blocks, and a maximum value of an initial location index of data that is of the first code block and that is distributed on the first time-domain symbol is not equal to a maximum value of an initial location index of data that is of the first code block and that is distributed on a resource unit, where the resource unit is a basic unit used to perform resource allocation for a scheduled user, and all time-domain symbols in the resource unit are first time-domain symbols; or the time-domain decentralization manner is used to indicate that on a first time-domain symbol including data from Q code blocks, there are at least two second code blocks belonging to the Q code blocks, a maximum value of initial location indexes of data that is of the second code blocks and that is distributed on the first time-domain symbol is not equal to a maximum value of initial location indexes of data that is of the second code blocks and that is distributed on the resource unit, and Q is an integer greater than 1.

Optionally, the time-domain decentralization manner includes:

a first time-domain decentralization manner, used to indicate that data from a same code block is de-centrally distributed on all time-domain symbols in a resource unit, where the resource unit is a basic unit used to perform resource allocation for a scheduled user:

a second time-domain decentralization manner, used to indicate that data from a same code block is de-centrally distributed on all time-domain symbols of a same slot in the resource unit; and a third time-domain decentralization manner, used to indicate that data from a same code block is de-centrally distributed on N time-domain symbols in the resource unit, where N is an integer greater than 1.

Optionally, the indication information is any one of the following information: downlink control information DCI, radio resource control RRC signaling, and a Media Access Control MAC layer control element CE.

Optionally, the apparatus further includes a processing unit, configured to process to-be-sent data based on the data distribution manner, and the transmission unit 1610 is specifically configured to send processed to-be-sent data to the network device 110.

Optionally, the processing unit is specifically configured to perform interleaving processing on the to-be-sent data based on the data distribution manner, where the interleaving processing includes interleaving on a bit stream of the to-be-sent data and/or interleaving on a modulation symbol of the to-be-sent data.

Optionally, the processing unit is specifically configured to perform resource mapping on the to-be-sent data by using a resource mapping rule corresponding to the data distribution manner based on the data distribution manner.

Optionally, the transmission unit 1610 is further configured to receive, based on the data distribution manner, data sent by the network device 110.

It should be understood that the apparatus 1600 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component that supports the described functions. In an optional example, a person skilled in the art may understand that the apparatus 1600 may be specifically the terminal device 120 in the foregoing embodiments, and the apparatus 1600 may be configured to perform procedures and/or steps that are corresponding to the terminal device 120 in the foregoing method embodiments. To avoid repetition, details are not described herein again.

Figure 17:
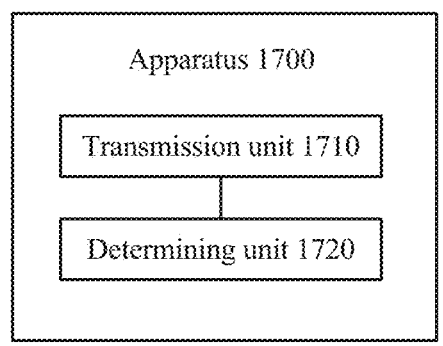
FIG. 17 is a schematic block diagram of another data transmission apparatus according to an embodiment of this application.

FIG. 17 shows a data transmission apparatus 1700 according to an embodiment of this application. The apparatus 1700 includes:

a transmission unit 1710, configured to: receive a demodulation reference signal DMRS attribute sent by a network device 110, where the DMRS attribute is corresponding to a data distribution manner, and the DMRS attribute is a DMRS pattern, a DMRS port number, or a quantity of OFDM symbols occupied by the DMRS signal to which the DMRS attribute belongs; and a determining unit 1720, configured to: determine, based on the DMRS attribute, a data distribution manner used for performing data transmission with the network device 110, where the data distribution manner is used to indicate distribution of data of a same code block on at least one time-domain symbol; where the transmission unit 1710 is further configured to:
perform data transmission with the network device 110 based on the data distribution manner.

According to the data transmission apparatus in this embodiment of this application, the data distribution manner used for data transmission between the network device 110 and the terminal device 120 can be flexibly configured, so as to meet different service requirements of a receive end.

Optionally, the data distribution manner is a time-domain decentralization manner or a time-domain centralization manner, the time-domain decentralization manner is used to indicate that data from a same code block is de-centrally distributed on a plurality of time-domain symbols, and the time-domain centralization manner is used to indicate that data from a same code block is centrally distributed on at least one consecutive time-domain symbol.

The time-domain centralization manner is used to indicate that in all code blocks, time-domain symbol indexes of first data and second data whose initial location indexes meet $x_1 < x_2$ meet $n_1 \le n_2$;

$x_1$ is the initial location index of the first data, $x_2$ is the initial location index of the second data, $n_1$ is the time-domain symbol index of the first data, and $n_2$ is the time-domain symbol index of the second data;

the time-domain decentralization manner is used to indicate that there is a first code block, and in the first code block, time-domain symbol indexes of third data and fourth data whose initial location indexes meet $x_3 < x_4$ meet $n_3 > n_4$; and $x_3$ is the initial location index of the third data, $x_4$ is the initial location index of the fourth data, $n_3$ is the time-domain symbol index of the third data, and $n_4$ is the time-domain symbol index of the fourth data.

Optionally, the time-domain centralization manner is used to indicate that a first time-domain symbol does not include at least two first code blocks, and a maximum value of an initial location index of data that is of the first code block and that is distributed on the first time-domain symbol is not equal to a maximum value of an initial location index of data that is of the first code block and that is distributed on a resource unit, where the resource unit is a basic unit used to perform resource allocation for a scheduled user, and all time-domain symbols in the resource unit are first time-domain symbols; or the time-domain decentralization manner is used to indicate that on a first time-domain symbol including data from Q code blocks, there are at least two second code blocks belonging to the Q code blocks, a maximum value of initial location indexes of data that is of the second code blocks and that is distributed on the first time-domain symbol is not equal to a maximum value of initial location indexes of data that is of the second code blocks and that is distributed on the resource unit, and Q is an integer greater than 1.

Optionally, the time-domain decentralization manner includes:

a first time-domain decentralization manner, used to indicate that data from a same code block is de-centrally distributed on all time-domain symbols in a resource unit, where the resource unit is a basic unit used to perform resource allocation for a scheduled user;

a second time-domain decentralization manner, used to indicate that data from a same code block is de-centrally distributed on all time-domain symbols of a same slot in the resource unit; and a third time-domain decentralization manner, used to indicate that data from a same code block is de-centrally distributed on N time-domain symbols in the resource unit, where N is an integer greater than 1.

Optionally, when an application scenario is that a demodulation result needs to be fed back on a current resource unit, the DMRS attribute is corresponding to the time-domain centralization manner, where the resource unit is a basic unit used to perform resource allocation for a scheduled user; or when an application scenario is that a demodulation result does not need to be fed back on a current resource unit, the DMRS attribute is corresponding to the time-domain decentralization manner.

Optionally, when the DMRS pattern is that the DMRS occupies one time-domain symbol, the DMRS pattern is corresponding to the time-domain centralization manner; or when the DMRS pattern is that the DMRS occupies at least two time-domain symbols, if there is no data transmission between any two time-domain symbols occupied by the DMRS, the DMRS pattern is corresponding to the time-domain centralization manner, or if there is data transmission between the at least two time-domain symbols occupied by the DMRS, the DMRS attribute is corresponding to the time-domain decentralization manner.

Optionally, the apparatus further includes a processing unit, configured to process to-be-sent data based on the data distribution manner, and the transmission unit 1710 is specifically configured to send processed to-be-sent data to the network device 110.

Optionally, the processing unit is specifically configured to perform interleaving processing on the to-be-sent data based on the data distribution manner, where the interleaving processing includes interleaving on a bit stream of the to-be-sent data and/or interleaving on a modulation symbol of the to-be-sent data.

Optionally, the processing unit is specifically configured to perform resource mapping on the to-be-sent data by using a resource mapping rule corresponding to the data distribution manner based on the data distribution manner.

Optionally, the transmission unit 1710 is further configured to receive, based on the data distribution manner, data sent by the network device 110.

It should be understood that the apparatus 1700 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component that supports the described functions. In an optional example, a person skilled in the art may understand that the apparatus 1700 may be specifically the terminal device 120 in the foregoing embodiments, and the apparatus 1700 may be configured to perform procedures and/or steps that are corresponding to the terminal device 120 in the foregoing method embodiments. To avoid repetition, details are not described herein again.

Figure 18:
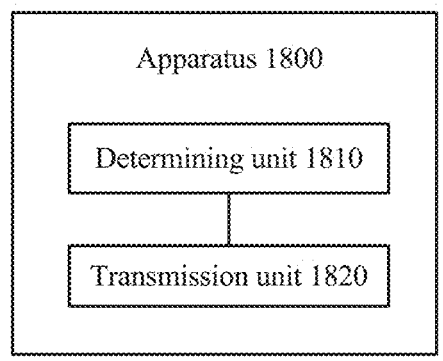
FIG. 18 is a schematic block diagram of another data transmission apparatus according to an embodiment of this application.

FIG. 18 shows a data transmission apparatus 1800 according to an embodiment of this application. The apparatus 1800 includes:

a determining unit 1810, configured to determine, based on a frame structure used for performing data transmission with a network device 110, a data distribution manner used for performing data transmission with the network device 110, where the data distribution manner is used to indicate distribution of data of a same code block on at least one time-domain symbol: and a transmission unit 1820, configured to perform data transmission with the network device 110 based on the data distribution manner.

According to the data transmission apparatus in this embodiment of this application, the data distribution manner used for data transmission between the network device 110 and the terminal device 120 can be flexibly configured, so as to meet different service requirements of a receive end.

Optionally, the data distribution manner is a time-domain decentralization manner or a time-domain centralization manner, the time-domain decentralization manner is used to indicate that data from a same code block is de-centrally distributed on a plurality of time-domain symbols, and the time-domain centralization manner is used to indicate that data from a same code block is centrally distributed on at least one consecutive time-domain symbol.

The time-domain centralization manner is used to indicate that in all code blocks, time-domain symbol indexes of first data and second data whose initial location indexes meet $x_1 < x_2$ meet $n_1 \leq n_2$;

$x_1$ is the initial location index of the first data, $x_2$ is the initial location index of the second data, $n_1$ is the time-domain symbol index of the first data, and $n_2$ is the time-domain symbol index of the second data;

the time-domain decentralization manner is used to indicate that there is a first code block, and in the first code block, time-domain symbol indexes of third data and fourth data whose initial location indexes meet $x_3 < x_4$ meet $n_3 > n_4$; and $x_3$ is the initial location index of the third data, $x_4$ is the initial location index of the fourth data, $n_3$ is the time-domain symbol index of the third data, and $n_4$ is the time-domain symbol index of the fourth data.

Optionally, the time-domain centralization manner is used to indicate that a first time-domain symbol does not include at least two first code blocks, a maximum value of an initial location index of data that is of the first code block and that is distributed on the first time-domain symbol is not equal to a maximum value of an initial location index of data that is of the first code block and that is distributed on a resource unit, where the resource unit is a basic unit used to perform resource allocation for a scheduled user, and all time-domain symbols in the resource unit are first time-domain symbols; or the time-domain decentralization manner is used to indicate that on a first time-domain symbol including data from Q code blocks, there are at least two second code blocks belonging to the Q code blocks, a maximum value of initial location indexes of data that is of the second code blocks and that is distributed on the first time-domain symbol is not equal to a maximum value of initial location indexes of data that is of the second code blocks and that is distributed on the resource unit, and Q is an integer greater than 1.

Optionally, the time-domain decentralization manner includes:

a first time-domain decentralization manner, used to indicate that data from a same code block is de-centrally distributed on all time-domain symbols in a resource unit, where the resource unit is a basic unit used to perform resource allocation for a scheduled user:

a second time-domain decentralization manner, used to indicate that data from a same code block is de-centrally distributed on all time-domain symbols of a same slot in the resource unit; and a third time-domain decentralization manner, used to indicate that data from a same code block is de-centrally distributed on N time-domain symbols in the resource unit, where N is an integer greater than 1.

Optionally, if an application scenario of the terminal device 120 is that a demodulation result needs to be fed back on a current resource unit, the frame structure is corresponding to the time-domain centralization manner, where the resource unit is a basic unit used to perform resource allocation for a scheduled user; or if an application scenario of the terminal device 120 is that a demodulation result does not need to be fed back on a current resource unit, the frame structure is corresponding to the time-domain decentralization manner.

It should be understood that the apparatus 1800 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component that supports the described functions. In an optional example, a person skilled in the art may understand that the apparatus 1800 may be specifically the terminal device 120 in the foregoing embodiments, and the apparatus 1800 may be configured to perform procedures and/or steps that are corresponding to the terminal device 120 in the foregoing method embodiments. To avoid repetition, details are not described herein again.

Figure 19:
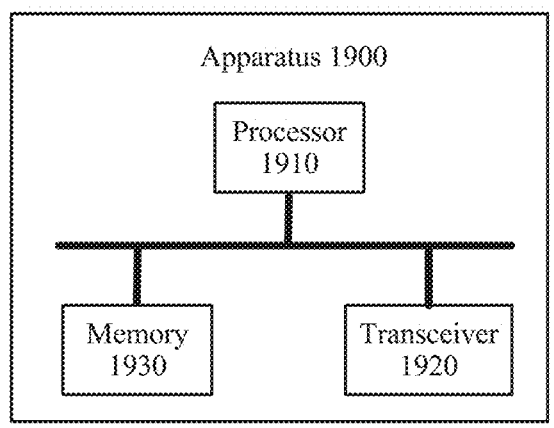
FIG. 19 is a schematic block diagram of another data transmission apparatus according to an embodiment of this application.

FIG. 19 shows another data transmission apparatus 1900 according to an embodiment of this application. The apparatus 1900 includes a processor 1910, a transceiver 1920, and a memory 1930. The processor 1910, the transceiver 1920, and the memory 1930 communicate with each other by using an internal connection channel. The memory 1930 is configured to store an instruction. The processor 1910 is configured to execute the instruction stored in the memory 1930, to control the transceiver 1920 to send a signal and/or receive a signal.

The processor 1910 is configured to determine, based on a service requirement or an application scenario of a terminal device 120, a data distribution manner used for performing data transmission with the terminal device 120, where the data distribution manner is used to indicate distribution of data of a same code block on at least one time-domain symbol, and the transceiver 1920 is configured to perform data transmission with the terminal device 120 based on the data distribution manner.

It should be understood that the apparatus 1900 may be specifically the network device 110 in the foregoing embodiments, and may be configured to perform steps and/or procedures that are corresponding to the network device 110 in the foregoing method embodiments. Optionally, the memory 1930 may include a read-only memory and a random access memory, and provide an instruction and data for the processor. A part of the memory may further include a non-volatile random access memory. For example, the memory may further store information about a device type. The processor 1910 may be configured to execute the instruction stored in the memory. In addition, when the processor 1910 executes the instruction stored in the memory, the processor 1910 is configured to perform the steps and/or the procedures corresponding to the network device 110 in the foregoing method embodiments.

Figure 20:
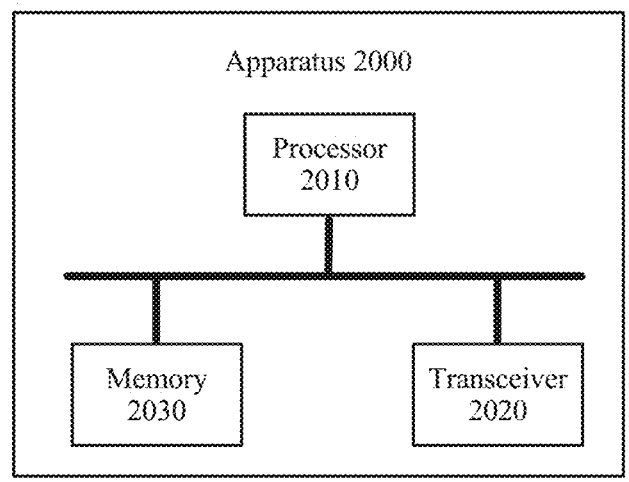
FIG. 20 is a schematic block diagram of another data transmission apparatus according to an embodiment of this application.

FIG. 20 shows another data transmission apparatus 2000 according to an embodiment of this application. The apparatus 2000 includes a processor 2010, a transceiver 2020, and a memory 2030. The processor 2010, the transceiver 2020, and the memory 2030 communicate with each other by using an internal connection channel. The memory 2030 is configured to store an instruction. The processor 2010 is configured to execute the instruction stored in the memory 2030, to control the transceiver 2020 to send a signal and/or receive a signal.

The transceiver 2020 is configured to receive indication information sent by a network device 110, where the indication information is used to indicate a data distribution manner used for performing data transmission by the terminal device 120 with the network device 110. The data distribution manner is used to indicate distribution of data of a same code block on at least one time-domain symbol. The processor 2010 is configured to determine the data distribution manner according to the indication information. The transceiver 2020 is further configured to perform data transmission with the network device 110 based on the data distribution manner.

It should be understood that the apparatus 2000 may be specifically the terminal device 120 in the foregoing embodiments, and may be configured to perform steps and/or procedures that are corresponding to the terminal device 120 in the foregoing method embodiments. Optionally, the memory 2030 may include a read-only memory and a random access memory, and provide an instruction and data for the processor. A part of the memory may further include a non-volatile random access memory. For example, the memory may further store information about a device type. The processor 2010 may be configured to execute the instruction stored in the memory. In addition, when the processor 2010 executes the instruction stored in the memory, the processor 2010 is configured to perform the steps and/or the procedures corresponding to the terminal device 120 in the foregoing method embodiments.

Figure 21:
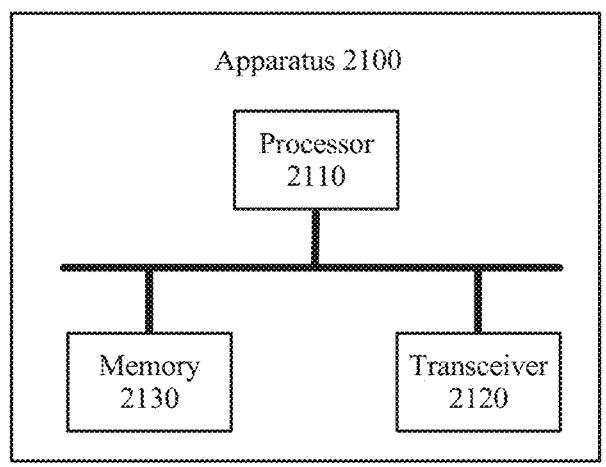
FIG. 21 is a schematic block diagram of another data transmission apparatus according to an embodiment of this application.

FIG. 21 shows another data transmission apparatus 2100 according to an embodiment of this application. The apparatus 2100 includes a processor 2110, a transceiver 2120, and a memory 2130. The processor 2110, the transceiver 2120, and the memory 2130 communicate with each other by using an internal connection channel. The memory 2130 is configured to store an instruction. The processor 2110 is configured to execute the instruction stored in the memory 2130, to control the transceiver 2120 to send a signal and/or receive a signal.

The transceiver 2120 is configured to receive a demodulation reference signal DMRS attribute sent by a network device 110, where the DMRS attribute is corresponding to a data distribution manner, and the DMRS attribute is a DMRS pattern, a DMRS port number, or a quantity of OFDM symbols occupied by the DMRS signal to which the DMRS attribute belongs. The processor 2110 is configured to determine, based on the DMRS attribute, a data distribution manner used for performing data transmission with the network device 110. The data distribution manner is used to indicate distribution of data of a same code block on at least one time-domain symbol. The transceiver 2120 is further configured to perform data transmission with the network device 110 based on the data distribution manner.

It should be understood that the apparatus 2100 may be specifically the terminal device 120 in the foregoing embodiments, and may be configured to perform steps and/or procedures that are corresponding to the terminal device 120 in the foregoing method embodiments. Optionally, the memory 2130 may include a read-only memory and a random access memory, and provide an instruction and data for the processor. A part of the memory may further include a non-volatile random access memory. For example, the memory may further store information about a device type. The processor 2110 may be configured to execute the instruction stored in the memory. In addition, when the processor 2110 executes the instruction stored in the memory, the processor 2110 is configured to perform the steps and/or the procedures corresponding to the terminal device 120 in the foregoing method embodiments.

Figure 22:
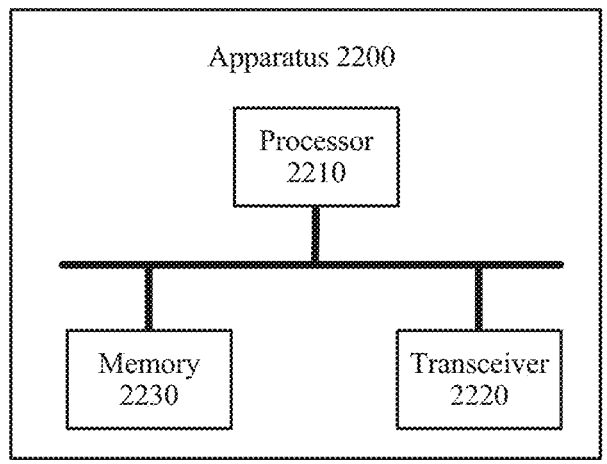
FIG. 22 is a schematic block diagram of another data transmission apparatus according to an embodiment of this application.

FIG. 22 shows another data transmission apparatus 2200 according to an embodiment of this application. The apparatus 2200 includes a processor 2210, a transceiver 2220, and a memory 2230. The processor 2210, the transceiver 2220, and the memory 2230 communicate with each other by using an internal connection channel. The memory 2230 is configured to store an instruction. The processor 2210 is configured to execute the instruction stored in the memory 2230, to control the transceiver 2220 to send a signal and/or receive a signal.

The transceiver 2220 is configured to receive a demodulation reference signal DMRS attribute sent by a network device 110, where the DMRS attribute is corresponding to a data distribution manner, and the DMRS attribute is a DMRS pattern, a DMRS port number, or a quantity of OFDM symbols occupied by the DMRS signal to which the DMRS attribute belongs. The processor 2210 is configured to determine, based on the DMRS attribute, a data distribution manner used for performing data transmission with the network device 110. The data distribution manner is used to indicate distribution of data of a same code block on at least one time-domain symbol. The transceiver 2220 is further configured to perform data transmission with the network device 110 based on the data distribution manner.

It should be understood that the apparatus 2200 may be specifically the terminal device 120 in the foregoing embodiments, and may be configured to perform steps and/or procedures that are corresponding to the terminal device 120 in the foregoing method embodiments. Optionally, the memory 2230 may include a read-only memory and a random access memory, and provide an instruction and data for the processor. A part of the memory may further include a non-volatile random access memory. For example, the memory may further store information about a device type. The processor 2210 may be configured to execute the instruction stored in the memory. In addition, when the processor 2210 executes the instruction stored in the memory, the processor 2210 is configured to perform the steps and/or the procedures corresponding to the terminal device 120 in the foregoing method embodiments.

It should be understood that, in the embodiments of this application, the processor in the foregoing apparatus may be a central processing unit (CPU), or the processor may be another general-purpose processor, a digital signal processor (DSP), an application-specific integrated circuit (ASIC), a field programmable gate array (FPGA), or another programmable logic device, a discrete gate, a transistor logic device, a discrete hardware component, or the like. The general-purpose processor may be a microprocessor or the processor may be any conventional processor, or the like.

In an implementation process, each step of the foregoing method may be completed by using an integrated logical circuit of hardware in the processor or an instruction in a form of software. The steps of the methods disclosed with reference to the embodiments of this application may be directly performed and completed by using a hardware processor, or may be performed and completed by using a combination of hardware and software units in the processor. The software unit may be located in a mature storage medium in the field, such as a random access memory, a flash memory, a read-only memory, a programmable read-only memory, an electrically-erasable programmable memory, or a register. The storage medium is located in the memory, and the processor executes the instruction in the memory and completes the steps in the foregoing methods in combination with hardware of the processor. To avoid repetition, details are not described herein.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe interchangeability between the hardware and the software, the foregoing has generally described steps and compositions of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, and the indirect couplings or communication connections between the apparatuses or units may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device 110, or the like) to perform all or a part of the steps of the methods described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission apparatus, comprising:
at least one processor; and
a non-transitory computer-readable storage medium coupled to the at least one processor and storing programming instructions for execution by the at least one processor, the programming instructions instruct the at least one processor to:
cause the data transmission apparatus to transmit, to a terminal device, indication information indicating a data distribution manner selected from a first data distribution manner and a second data distribution manner;
cause the data transmission apparatus to perform data transmission with the terminal device according to the data distribution manner;
wherein the data distribution manner indicating a distribution of modulation symbols of a code block (CB) on one or more orthogonal frequency division multiplexing (OFDM) symbols of at least one resource unit, the one or more OFDM symbols are consecutive in time-domain,
and wherein a first modulation symbol of the modulation symbols is located on one of the one or more OFDM symbols associated with a first OFDM symbol index, a second modulation symbol of the modulation symbols is located on one of the one or more OFDM symbols associated with a second OFDM symbol index, the first OFDM symbol index is smaller than or equal to the second OFDM symbol index when a first location index associated with the first modulation symbol is smaller than a second location index associated with the second location index; and wherein modulation symbols distributed on a same OFDM symbol of the one or more OFDM symbols are interleaved in frequency-domain according to the first data distribution manner and are not interleaved in the frequency-domain according to the second data distribution manner.

2. The apparatus according to claim 1, wherein the indication information is downlink control information.

3. The apparatus according to claim 1, wherein the modulation symbols distributed on the same OFDM symbol are arranged in a sequence that corresponding location indexes associated with the modulation symbols are in an increasing order according to the second data distribution manner.

4. The apparatus according to claim 3, wherein the second data distribution manner is obtained by mapping at least a portion of the modulation symbols of the CB to one of the one or more OFDM symbols.

5. The apparatus according to claim 4, wherein the second data distribution manner is further obtained by mapping the remaining portion of the modulation symbols of the CB to a next OFDM symbol of the one or more OFDM symbols when subcarriers of the one of the one or more OFDM symbols are fully filled after mapping the at least a portion of the modulation symbols.

6. The apparatus according to claim 1, wherein the first data distribution manner is obtained by:
mapping at least a portion of the modulation symbols of the CB to one of the one or more OFDM symbols;
mapping the remaining portion of the modulation symbols of the CB to a next OFDM symbol of the one or more OFDM symbols when subcarriers of the one of the one or more OFDM symbols are fully filled after mapping the at least a portion of the modulation symbols; and
interleaving modulation symbols distributed on a same OFDM symbol of the one or more OFDM symbols in frequency-domain.

7. A network device, comprising:
a transceiver; and
at least one processor connected to the transceiver; wherein,
the transceiver is configured to:
transmit, to a terminal device, indication information indicating a data distribution manner selected from a first data distribution manner and a second data distribution manner;
perform data transmission with the terminal device according to the data distribution manner;
wherein the data distribution manner indicating a distribution of modulation symbols of a code block (CB) on one or more orthogonal frequency division multiplexing (OFDM) symbols of at least one resource unit, the one or more OFDM symbols are consecutive in time-domain,
and wherein a first modulation symbol of the modulation symbols is located on one of the one or more OFDM symbols associated with a first OFDM symbol index, a second modulation symbol of the modulation symbols is located on one of the one or more OFDM symbols associated with a second OFDM symbol index, the first OFDM symbol index is smaller than or equal to the second OFDM symbol index when a first location index associated with the first modulation symbol is smaller than a second location index associated with the second location index; and wherein modulation symbols distributed on a same OFDM symbol of the one or more OFDM symbols are interleaved in frequency-domain according to the first data distribution manner and are not interleaved in the frequency-domain according to the second data distribution manner.

8. The network device according to claim 7, wherein the indication information is downlink control information.

9. The network device according to claim 7, wherein the modulation symbols distributed on the same OFDM symbol are arranged in a sequence that corresponding location indexes associated with the modulation symbols are in an increasing order according to the second data distribution manner.

10. The network device according to claim 9, wherein the second data distribution manner is obtained by mapping at least a portion of the modulation symbols of the CB to one of the one or more OFDM symbols.

11. The network device according to claim 10, wherein the second data distribution manner is further obtained by mapping the remaining portion of the modulation symbols of the CB to a next OFDM symbol of the one or more OFDM symbols when subcarriers of the one of the one or more OFDM symbols are fully filled after mapping the at least a portion of the modulation symbols.

12. The network device according to claim 7, wherein the first data distribution manner is obtained by:
- mapping at least a portion of the modulation symbols of the CB to one of the one or more OFDM symbols;
- mapping the remaining portion of the modulation symbols of the CB to a next OFDM symbol of the one or more OFDM symbols when subcarriers of the one of the one or more OFDM symbols are fully filled after mapping the at least a portion of the modulation symbols; and
- interleaving modulation symbols distributed on a same OFDM symbol of the one or more OFDM symbols in frequency-domain.

13. A data transmission method, comprising:
- transmitting, by a data transmission apparatus, indication information to a terminal device, wherein the indication information indicates a data distribution manner selected from a first data distribution manner and a second data distribution manner;
- performing, by the data transmission apparatus, data transmission with the terminal device according to the data distribution manner;
- wherein the data distribution manner indicating a distribution of modulation symbols of a code block (CB) on one or more orthogonal frequency division multiplexing (OFDM) symbols of at least one resource unit, the one or more OFDM symbols are consecutive in time-domain,
- and wherein a first modulation symbol of the modulation symbols is located on one of the one or more OFDM symbols associated with a first OFDM symbol index, a second modulation symbol of the modulation symbols is located on one of the one or more OFDM symbols associated with a second OFDM symbol index, the first OFDM symbol index is smaller than or equal to the second OFDM symbol index when a first location index associated with the first modulation symbol is smaller than a second location index associated with the second location index; and wherein modulation symbols distributed on a same OFDM symbol of the one or more OFDM symbols are interleaved in frequency-domain according to the first data distribution manner and are not interleaved in the frequency-domain according to the second data distribution manner.

14. The method according to claim 13, wherein the indication information is downlink control information.

15. The method according to claim 13, wherein the modulation symbols distributed on the same OFDM symbol are arranged in a sequence that corresponding location indexes associated with the modulation symbols are in an increasing order according to the second data distribution manner.

16. The method according to claim 15, wherein the second data distribution manner is obtained by mapping at least a portion of the modulation symbols of the CB to one of the one or more OFDM symbols.

17. The method according to claim 16, wherein the second data distribution manner is further obtained by mapping the remaining portion of the modulation symbols of the CB to a next OFDM symbol of the one or more OFDM symbols when subcarriers of the one of the one or more OFDM symbols are fully filled after mapping the at least a portion of the modulation symbols.

18. The method according to claim 13, wherein the first data distribution manner is obtained by:
- mapping at least a portion of the modulation symbols of the CB to one of the one or more OFDM symbols;
- mapping the remaining portion of the modulation symbols of the CB to a next OFDM symbol of the one or more OFDM symbols when subcarriers of the one of the one or more OFDM symbols are fully filled after mapping the at least a portion of the modulation symbols; and
- interleaving modulation symbols distributed on a same OFDM symbol of the one or more OFDM symbols in frequency-domain.

19. A non-transitory computer-readable storage medium coupled to one or more computers and configured with instructions executable by the one or more computers to:
- transmit, by the one or more computers, indication information to a terminal device, wherein the indication information indicates a data distribution manner selected from a first data distribution manner and a second data distribution manner;
- perform, by the one or more computers, data transmission with the terminal device according to the data distribution manner;
- wherein the data distribution manner indicating a distribution of modulation symbols of a code block (CB) on one or more orthogonal frequency division multiplexing (OFDM) symbols of at least one resource unit, the one or more OFDM symbols are consecutive in time-domain,
- and wherein a first modulation symbol of the modulation symbols is located on one of the one or more OFDM symbols associated with a first OFDM symbol index, a second modulation symbol of the modulation symbols is located on one of the one or more OFDM symbols associated with a second OFDM symbol index, the first OFDM symbol index is smaller than or equal to the second OFDM symbol index when a first location index associated with the first modulation symbol is smaller than a second location index associated with the second location index; and wherein modulation symbols distributed on a same OFDM symbol of the one or more OFDM symbols are interleaved in frequency-domain according to the first data distribution manner and are not interleaved in the frequency-domain according to the second data distribution manner.

20. The non-transitory computer-readable storage medium according to claim 19, wherein the indication information is downlink control information.

21. The non-transitory computer-readable storage medium according to claim 19, wherein the modulation symbols distributed on the same OFDM symbol are arranged in a sequence that corresponding location indexes associated with the modulation symbols are in an increasing order according to the second data distribution manner.

22. The non-transitory computer-readable storage medium according to claim 21, wherein the second data distribution manner is obtained by mapping at least a portion of the modulation symbols of the CB to one of the one or more OFDM symbols.

23. The non-transitory computer-readable storage medium according to claim 22, wherein the second data distribution manner is further obtained by mapping the remaining portion of the modulation symbols of the CB to a next OFDM symbol of the one or more OFDM symbols when subcarriers of the one of the one or more OFDM symbols are fully filled after mapping the at least a portion of the modulation symbols.

24. The non-transitory computer-readable storage medium according to claim 19, wherein the first data distribution manner is obtained by:
- mapping at least a portion of the modulation symbols of the CB to one of the one or more OFDM symbols;
- mapping the remaining portion of the modulation symbols of the CB to a next OFDM symbol of the one or more OFDM symbols when subcarriers of the one of the one or more OFDM symbols are fully filled after mapping the at least a portion of the modulation symbols; and
- interleaving modulation symbols distributed on a same OFDM symbol of the one or more OFDM symbols in frequency-domain.

* * * * *